United States Patent
Bailey et al.

(10) Patent No.: US 11,299,871 B2
(45) Date of Patent: Apr. 12, 2022

(54) LEAK DETECTION METHOD AND APPARATUS

(71) Applicant: HomeServe plc, Walsall (GB)

(72) Inventors: Samuel Bailey, London (GB); Philip Yorke, London (GB); Richard Lawrence, Nuneaton (GB)

(73) Assignee: HOMESERVE PLC, Walsall (GB)

( * ) Notice: Subject to any disclaimer, the term of this patent is extended or adjusted under 35 U.S.C. 154(b) by 81 days.

(21) Appl. No.: 16/753,672

(22) PCT Filed: Oct. 5, 2018

(86) PCT No.: PCT/GB2018/052850
§ 371 (c)(1),
(2) Date: Apr. 3, 2020

(87) PCT Pub. No.: WO2019/069091
PCT Pub. Date: Apr. 11, 2019

(65) Prior Publication Data
US 2020/0256042 A1  Aug. 13, 2020

(30) Foreign Application Priority Data
Oct. 5, 2017 (GB) ..................................... 1716230

(51) Int. Cl.
| *E03B 7/04* | (2006.01) |
| *E03B 7/00* | (2006.01) |
| *G01M 3/28* | (2006.01) |

(52) U.S. Cl.
CPC ........... *E03B 7/003* (2013.01); *G01M 3/2815* (2013.01)

(58) Field of Classification Search
CPC ........ E03B 7/00–08; E03B 7/003; F17D 5/00; F17D 5/06; G01M 3/26; G01M 3/28; G01M 3/2815
See application file for complete search history.

(56) References Cited

U.S. PATENT DOCUMENTS

| 2,853,874 A | 9/1958 | Mennesson |
| 5,046,519 A * | 9/1991 | Stenstrom ........... G01M 3/2815 137/1 |

(Continued)

FOREIGN PATENT DOCUMENTS

| DE | 19942185 A1 | 3/2001 |
| DE | 102006036518 A1 | 2/2008 |

(Continued)

OTHER PUBLICATIONS

International Preliminary Report on Patentability directed to related International Patent Application No. PCT/GB2018/052850, dated Apr. 16, 2020; 11 pages.

(Continued)

*Primary Examiner* — Nguyen Q. Ha
(74) *Attorney, Agent, or Firm* — Sterne, Kessler, Goldstein & Fox P.L.L.C.

(57) ABSTRACT

A method for testing for a possible water leak in at least a part of a water system, comprising: closing all known water usage taps (42) within the part of the water system to be tested; closing at least one stop cock (14) or valve of the water system to isolate the part of the water system from its replacement water source (12) (or sources), and any external replacement pressure source (or sources); and then a) detecting a first pressure P0 within the isolated part of the water system at a sensor (62, 48) connected to the part of the water system, waiting a period of time t and then detecting a second pressure within the isolated part of the water system at that sensor (62, 48); and b) releasing a volume of water VR from the water system out of the isolated part of the water system via a vent (42) in the isolated part of the water system, before then closing the vent (42), step b) further comprising detecting the pressures either side of that release at that sensor (62, 48); using the pressure drop caused by the approximately known or measured volume of water VR to (Continued)

enable an estimate of the relationship between change in pressure in the system and the volume of water released to be established, and based on the relationship between the change in pressure and the known release volume, calculating an estimate of the actual volume of the unknown water loss volume $V_L$ based upon the recorded pressure loss in the system in the known period of time t.

19 Claims, 7 Drawing Sheets

(56) References Cited

U.S. PATENT DOCUMENTS

| | | | | |
|---|---|---|---|---|
| 5,218,859 | A * | 6/1993 | Stenstrom | ............... E03B 7/003 73/40.5 R |
| 2021/0131905 | A1* | 5/2021 | Yu | ............................. F17D 5/02 |

FOREIGN PATENT DOCUMENTS

| | | | | |
|---|---|---|---|---|
| DE | 102015115664 | B3 | 2/2017 | |
| GB | 917111 | A | 1/1963 | |
| GB | 2102124 | A | 1/1983 | |
| JP | S5827041 | | 2/1983 | |
| JP | 2009002700 | A | 1/2009 | |
| KR | 101794968 | B | 11/2017 | |
| WO | WO-8901112 | A1 * | 2/1989 | ............... F17D 5/06 |
| WO | WO96/16321 | A1 | 5/1996 | |
| WO | WO-2017045819 | A * | 3/2017 | ............... F17D 5/02 |

OTHER PUBLICATIONS

Search Report directed to related International Application No. GB1716230.6, dated Aug. 31, 2018, 2 pages.

* cited by examiner

Either compare angles α1 and α2
or drops d1 and d2

LEAK DETECTION METHOD AND APPARATUS

The present invention relates to a method of detecting whether there is a leak in a building's water system, and if so the height or location thereof, and a product for carrying out the method. This method will be of most use for finding out if a system has a leak which cannot be detected by visual inspection, or to determine how fast a system is leaking if or when a leak is found.

The water system in a building will typically be one of two types—a 'unvented' or 'pressurised' system or a vented system. A pressurised system is a water system held at mains pressure, with water either heated on demand by a combi-boiler or heated and held in a pressurised 'unvented' hot water cylinder. Such systems contain an expansion vessel or 'EV' which contains a bladder of air which is compressed to a greater or lesser extent as the pressure in the system increases or decreases. FIG. 1 illustrates a simple vented system. A 'vented' system is instead fed from a cold water tank or 'header tank'—usually in a loft of the building, which is supplied with mains water, but is itself only loosely covered and held at atmospheric pressure. In the vented system, water is then fed from the header tank to the hot water system and in some cases to cold water taps. Other cold taps, including in nearly all cases the kitchen cold tap, are instead supplied directly from the mains in case bacteria breed in the header tank. The pressure in the parts of the system fed by the header tank is simply a product of the weight of water above them. This pressure, as caused by the weight of water, is called the 'head'.

If there is a leak in either of these systems, the water that leaks can cause damage to the structure or furnishings of the building. The present invention therefore seeks to provide a method and apparatus for detecting the presence of leaks and preferably for locating the position or height of said leak within the building/pipework if detected.

Known methods for leak detection include using the household water meter—this typically only detects larger leaks. It is done by closing all taps etc., so that there is no intended use of water, recording the reading of the water meter, waiting for a certain period of time, such as 15 minutes, and then checking the meter reading again. If the meter has recorded water use during the test, it might be due to a leak. Another test, for pressurised parts of a water system, involves shutting off the mains water supply (e.g. by closing the building's stop cock), closing all taps etc., and seeing whether the pressure within that pressurised part of the water system falls.

These techniques are well known in the industry, and there are more detailed versions too, e.g. for factoring in how changes in temperature might affect the pressure reading etc. However, as most buildings will depressurise somewhat over time, this then begs the question; when should we be worried?—i.e. is this depressurisation the sign of a serious leak or is it merely the result of the system settling, and how do we differentiate between the two?

The present invention seeks to provide a readily accessible and effective approach for detecting, and perhaps locating, leaks in the water system, and for providing an indication to allow determination as to whether the leak could be a concern.

According to a first aspect of the present invention there is provided a method for testing for a possible water leak in at least a part of a water system, comprising:
- closing all known water usage taps within the part of the water system to be tested;
- closing at least one stop cock or valve of the water system to isolate the part of the water system from its replacement water source (or sources), and any external replacement pressure source (or sources); and then
- a) detecting a first pressure $P_0$ within the isolated part of the water system at a sensor connected to the part of the water system, waiting a period of time t and then detecting a second pressure $P_1$ within the isolated part of the water system at that sensor; and
- b) releasing a volume of water $V_R$ from the water system out of the isolated part of the water system via a vent in the isolated part of the water system, before then closing the vent, step b) further comprising detecting the pressures either side of that release at that sensor;
- the method thus recording a) a pressure loss in the system over a period of time t caused by an unknown leak volume of water $V_L$ escaping the system and b) a pressure loss in the system caused by an approximately known or measurable volume of water released from the system;
- the method further comprising using the pressure drop caused by the approximately known or measured volume of water $V_R$ to enable an estimate of the relationship between change in pressure in the system and the volume of water released to be established, and based on the relationship between the change in pressure and the known release volume, calculating an estimate of the actual volume of the unknown water loss volume based upon the recorded pressure loss in the system in the known period of time t.

This method can also be used for liquid systems other than water.

If the water is to be measured as it is released, it can be vented into a measuring device. The volume of water may then be known by measuring the amount of water released with the measuring device. As an example, this may by a cup in a sink below a tap, the volume being measured by either measuring the volume or weighing it and converting that weight into a volume (as the volume of the liquid per unit mass/weight is likely to be known). Using a measuring cup is perhaps the easiest approach. More complex fixed volume release vents could also be used, however, or a fixed time of release may be used to allow an approximation of the volume released for a given pressure and vent size.

Step a) may be before or after step b).

One of the two detected pressures of step a) may be one of the two detected pressures of step b). For example, if step a) is carried out before step b), then the second pressure detected in step a) may be the first pressure detected in step b)—i.e. the pressure before the release of the water. Alternatively if step b) is carried out before step a), then the second pressure detected in step b) may be the first pressure detected in step a)—i.e. the pressure after the release of the water and at the start of the period of time t.

The method may further offer a conclusion regarding that calculated estimate volume, wherein if that calculated estimate volume is greater than a predetermined value greater than 0 it is determined that there is a possible water leak needing investigation.

In another aspect of the present invention there is provided a method for testing for a possible water leak in at least a part of a water system, comprising:
- closing all known water usage taps within the part of the water system to be tested;
- closing at least one stop cock or valve of the water system to isolate the part of the water system from its replacement water source (or sources), and any external replacement pressure source (or sources); and then a) detecting a first pressure $P_0$ within the isolated part of the water system at a sensor connected to the part of the water system, waiting a period of time t and then detecting a second pressure $P_1$ within the isolated part of the water system at that sensor; and b) releasing a volume of water $V_R$ from the water system out of the isolated part of the water system via a vent in the isolated part of the water system, before then closing the vent and detecting a third pressure $P_2$ within the re-isolated part of the water system at that sensor;

the method further comprising:

calculating an approximate leaked water loss $V_L$ by using the following equation:

$$V_L = V_R * P_2(P_0 - P_1)/(P_0(P_1 - P_2)).$$

Here the pressure readings are absolute pressures. Where they are gauge pressures, the formula may be substituted with the following:

$$V_L = V_R * (P_{2\ gauge} + P_{Atmospheric}) * (P_0 - P_1) / ((P_{0\ gauge} + P_{Atmospheric}) * (P_1 - P_2))$$

The released volume $V_R$ may again be measured or approximately known, as before.

The method may make a conclusion such as where if $V_L$ is greater than a predetermined value greater than 0, it is determined that there is a possible water leak needing investigation.

In some embodiments the period of time t is a period of time exceeding 2 minutes. For larger leaks, this may be a shorter period of time—say 1 minute. However, such larger leaks are more likely to be visually detectable.

In some embodiments the time between taking the second and third pressures $P_1$ and $P_2$ is less than 20 seconds. However, it can be longer if time t is much longer than 2 minutes.

Preferably the period of time t is more than 2 minutes. In a preferred embodiment it is between 3 and 5 minutes, or less than 10 minutes. The most preferred time is around 5 minutes, although a wait of 3 minutes is fine too, but it may reduce accuracy a bit. The time can be longer, however, with the invention still working, although a limiting factor can be ensuring that the system doesn't depressurise completely, or at least that it doesn't depressurise to such an extent that letting out the fixed volume of water then causes it to depressurise completely.

The time can also be varied further, especially if the pressure drop is rapid—in which case the wait time might be reduced to 20-30 seconds so that the system doesn't completely depressurise. This could be arranged to occur automatically if a pressure reduction rate is measured.

In the case instead of the pressure drop being slower, the wait time could be extended—to more than 5 or 10 minutes—so that errors in the pressure measurements have less effect on the calculation.

Preferably the time between taking the second and third pressures $P_1$ and $P_2$ is between 1 and 12 seconds. In a preferred embodiment it is about 10 seconds.

In some circumstances, 1 second can be a bit too fast—there can be an instantaneous spike in pressure as water is released which might be accidentally recorded if only a 1 second interval is used, so it is better to wait a little longer—say 3 seconds or more, or to take a couple of readings to see if a spike has occurred. In most circumstances an interval of 5 to 10 seconds is preferred.

Generally the time t between taking the first and second pressures $P_0$ and $P_1$ is significantly longer than the time between taking the second and third pressures $P_1$ and $P_2$—preferably it is at least 10 times longer, and more preferably at least 20 times longer. Most preferably it is at least 30 times longer.

Although we recite that at least one stop cock or valve is shut, it is to be understood that every access point to replacement water in the part of the system being tested is closed, and commonly this is just a single stop cock or valve.

Preferably the released volume of water $V_R$ is less than 80 ml, and more preferably less than 50 ml. In one embodiment it is about 43 ml. In another it is about 25 ml of water. It is helpful if the volume of water is large enough to be easily measurable so as to give a more accurate idea of leak rate (i.e. ideally greater than 5 ml, and more preferably greater than 10 ml), but yet still small enough not to totally depressurise the system. In preferred embodiments, on small household water systems, with no expansion vessels, this would be below 10 ml, whereas on a larger water system, as much as 50 ml may be appropriate.

Preferably the sensor is located at or near the bottom of the part of the water system being tested. It may be attached, for example, to a washing machine attachment point, or similar, or to a tap.

The vent for releasing the volume of water $V_R$ may be a tap within the isolated part of the water system, such as a basin tap or a kitchen tap. Preferably it is near the sensor to facilitate taking the second and third pressure readings in quick succession either side of the release of the volume of water $V_R$. In a preferred embodiment it is attached to the same test assembly as the sensor so that the test assembly, when attached to an attachment point of the water system, attaches both a vent for water release and a sensor.

Preferably the method calculates the rate of water release by dividing $V_L$ by t. By detecting how fast it is leaking, the leak rate ($V_L/t$), a decision can be taken as to whether the leak needs fixing. For example, a very slow leak may just be the system settling down, whereby no action is needed. Preferably a need to fix a leak is identified when the determined leak rate exceeds a threshold, such as more than 0.1 ml per minute, or more than 1 ml/min or perhaps 2 ml/min.

Preferably this first aspect is for testing for leaks in a pressurised water system. For example, the pressure may be in excess of the head of the water within the part of the water system being tested—for example by it usually being connected to the mains—the stop cock or valve being the mains isolator stop cock.

Preferably the method also includes attaching the pressure sensor—in advance of closing the mains stop cock, although a pressure sensor may be already attached to the water system, whereby such an attachment is not essential.

In a variant to the above, multiple pressure readings are taken before and potentially after the release of the volume of water, and then the or each curve is extrapolated forwards (and potentially backwards) for the resultant trace(s) such that the second and third pressure values representing an instantaneous pressure change resulting from the controlled water loss can be determined. This approach can give a more accurate leak volume determination as it removes some errors arising in the calculation or the test. For example, errors can arise due to the non-zero duration of the water release, the continuing pressure losses arising due to the pre-existing "leak" during the interval between the pressure readings either side of the water release, and pressure spikes arising due to valve opening or closing processes.

According to this aspect of the present invention there is provided a method for testing for leaks in at least a part of a water system, comprising:

closing all known water usage taps within the part of the water system to be tested;

closing at least one stop cock or valve of the water system to isolate the part of the water system from its replacement water source, and any external replacement pressure sources; and then:

a) detecting pressures within the isolated part of the water system at a sensor connected to the part of the water system at predetermined intervals for a period of time t long enough to obtain a sequence of pressure readings; and b) releasing a volume of water $V_R$ from the water system out of the isolated part of the water system via a vent in the isolated part of the water system, before then closing the vent, step b) further comprising detecting pressures either side of that release at that sensor.

With the pressure and time/volume data collected the method recorded a) a pressure loss sequence in the system over a period of time t caused by an unknown leak volume of fluid $V_L$ escaping the system and b) a pressure loss in the system caused by an approximately known or measurable volume of fluid escaping the system. The approximately known or measurable volume can be measured as before. Again, therefore, the method may use the pressure drop caused by the approximately known volume of fluid $V_R$ to enable an estimate of the relationship between change in pressure in the system and the volume of fluid released to be established, and based on the relationship between the change in pressure and the known release volume, calculate an estimate of the actual volume of the unknown fluid loss volume based upon the recorded pressure loss in the system in the known period of time t.

The method may further offer a conclusion regarding that calculated estimate volume, wherein if that calculated estimate volume is greater than a predetermined value greater than 0 it is determined that there is a possible water leak needing investigation.

As before, the approximately known volume of water may be known by measuring the amount of water released, e.g. by releasing it into a measuring cup.

Furthermore, step a) may be before or after step b).

Yet further, one of the two detected pressures of step b) may be one of the detected pressures of step b). For example, if step a) is carried out before step b), then a final pressure detected in step a) may be the first pressure detected in step b)—i.e. the pressure before the release of the water. Alternatively if step b) is carried out before step a), then the second pressure detected in step b) may be the first pressure detected in step a)—i.e. the pressure after the release of the water and at the start of the period of time t.

As a further alternative, the method may instead determine a gradient or decay rate of the pressure during the sequence of pressure readings, and then use that decay rate, and the pressure drop caused by the release of the approximately known volume of fluid $V_R$ to enable an estimate of the water loss from the leak $V_L$ to be determined.

According to a similar approach there is provided a method for testing for leaks in at least a part of a water system, comprising:

closing all known water usage taps within the part of the water system to be tested;

closing at least one stop cock or valve of the water system to isolate the part of the water system from its replacement water source, and any external replacement pressure sources; and then:

a) detecting pressures within the isolated part of the water system at a sensor connected to the part of the water system at various intervals for a period of time t long enough to obtain a sequence of pressure readings; and then b) releasing a volume of water $V_R$ from the water system out of the isolated part of the water system via a vent in the isolated part of the water system, before then closing the vent and detecting the pressures within the re-isolated part of the water system at that sensor at various intervals for a period of time long enough to obtain a second sequence of pressure readings.

The various intervals may be fixed intervals or variable intervals. Generally they are predetermined. Either way the intervals will be known or are recorded so that the pressures detected can be recorded against the time when they were taken. With the pressure and time data arising from this method, it becomes possible to extrapolate one or both sequences, one or both towards the other to allow an approximation of two pressures, these comprising a spike-corrected, pre-water-release pressure P2 and a spike-corrected post-water-release pressure P3, ideally taken at a fixed time point corresponding to time t within the extrapolated data. It is thus after a first pressure reading P0 was taken (P0 can also be taken from the extrapolated data, it thus too being spike-corrected, if need be—from the first sequence of pressure readings).

With this data, the present invention can also seek to approximate an amount of water leaking from the system during time t (VL). The method then can further comprise:

calculating an approximate leaked water loss $V_L$ by using the following equation:

$$V_L = V_R * P_2(P_0-P_1)/(P_0(P_1-P_2)).$$

As before, here the pressure readings are absolute pressures. Where they are gauge pressures, the formula may be substituted with the following:

$$V_L = V_R * (P_{2\,gauge}+P_{Atmospheric})*(P_0-P_1)/((P_{0\,gauge}+P_{Atmospheric})*(P_1-P_2)).$$

The method can also make a conclusion as to whether the leak is in need of investigation—if $V_L$ is greater than a predetermined value larger than 0, it is determined that there is a probable water leak to investigate.

Preferably each sequence of pressure readings comprises at least 4 pressure readings, and more preferably at least 10 pressure readings.

Preferably the period of time t is a period of time exceeding 20 seconds.

As with the first aspect, it is preferred that this method is carried out on a pressurised water system—i.e. with a pressure in excess of the pressure provided by the head of water above the sensor.

The extrapolation may be by fitting a straight line or curve through the or each sequence of pressure readings. The best-fit curve or line thus gives a smoothed or spike-corrected data set from which extrapolation is more readily achievable.

The line or curve enables a gradient or decay rate to be defined numerically. Commonly a leak results is a substantially linear gradient, if time t is between 5 minutes and an hour.

Variations of the above are as follows:
1. Rather than fitting a gradient or decay rate to the pressure readings before a fixed volume of fluid is released, one could release the fluid and then continue measuring pressure readings after the volume of fluid is released, and fit a gradient or decay rate to these readings instead. This approach could be used to give the leak rate at the lower, post-release system pressure.

The leak rate might then be multiplied by a factor (e.g. pre-release pressure/post-release pressure) to estimate the pre-release leak rate.

2. One could observe and record the drop in pressure during time t in the system due to a potential leak from a starting pressure $P_0$, through to a final pressure $P_1$, with as many intermediate readings as desired, but then re-pressurise the system to at or a little above the initial pressure $P_0$, before releasing the water and either:
   a. Cause a fixed or measured volume of fluid/water to be released and continue with one of the processes described above;
   b. Cause fluid/water to be released from the system, but stop releasing fluid/water when the pressure is at or still above $P_1$. By then measuring the volume of fluid you have released to achieve that pressure drop, you have an approximation of the amount of water leaked from the system in the first period t. Comparing this then to the time the system took to drop to the pressure it is now at due to the leak alone, a leak rate can be estimated. For example, if the system took 5 minutes to drop from 3.0 Bar to 2.9 Bar in the first run, and, after being re-pressurised to 3.0 Bar, releasing 20 ml of fluid caused a similar drop to 2.9 Bar, the leak rate could be estimated at 20 ml/5 mins=4 ml/min.
3. A version of 2) above, but where the steps are carried out instead in the opposite order, and thus first one causes a fixed or measured volume of fluid to be released from the system, recording the pre- and post-release pressures, before then re-pressurising the system to at, or a little above the pre-release pressure and then recording how long it takes for the pressure to fall from the pre-release to the post-release pressure without water being released. All things being equal, the system will have lost the same volume of water through the leak as in the intentional water release, and thus the leak rate can be approximated.
4. Another version but where an allowance is made for the fact that the release of fluid will not be instantaneous; this means that fluid will also be being released from the leak point at the same time as the release from the vent point, thus affecting the pressure readings.

Regarding version 4, according to the present invention it is preferred that the method involves extrapolating forward a gradient or fitted curve of the pressure profile recorded before fluid released to give an estimated pre-release pressure at the time the post-release pressure is recorded and thus an instantaneous pressure difference.

It is preferred alternatively that the method comprises extrapolating the gradient or fitted curve of the pressure profile recorded after fluid is released to give an estimated post-release pressure at the time the pre-release pressure was recorded and thus an instantaneous pressure difference.

Another correction can be to compare the time taken to drop from $P_0$ to $P_1$ due to the effects of the leak alone ($t_{leak}$) to the time taken when fluid was being released ($t_{release}$), so that calculated leak rate can be corrected as:

$$\text{Measured fluid released}/(t_{leak}-t_{release})$$

To exemplify this, say that the process of releasing 20 ml of fluid took 30 seconds, while the initial leak from $P_0$ to $P_1$ took 5 mins. Then, throughout that 30 second period (0.5 minutes), the system was also leaking naturally, hence the total volume of fluid lost to cause the $P_0 \rightarrow P_1$ pressure drop was actually 20 ml+leak rate/min*0.5, rather than just the 20 ml measured. Hence:

$$5*\text{leak rate}=20+0.5*\text{leak rate}$$

$$4.5*\text{leak rate}=20,$$

$$\text{leak rate}=20/4.5=4.44 \text{ ml/min}.$$

It should also be noted that the leak rate calculated is an estimated average of the leak rate for the period when the system is observed—a period during which it is depressurising not least due to the presence of the leak. Since leak rate is proportional to gauge pressure, it is possible to determine the leak rate of the system at another desired pressure by taking the calculated leak rate, dividing by the average pressure over the observation period, and then multiplying by the desired pressure.

If multiple pressure readings have been taken during the depressurisation period, this can be further refined: Since discharge rate is proportional to gauge pressure, calculated total discharge volume will be proportional to the area under the depressurisation line or curve. This area could be calculated by integrating the derived line of best fit, or by summing the areas of the finite trapezoidal elements that will be described by each two successive pressure readings that were taken during the depressurisation period and the time period between them. Total discharge can then be calculated for any other pressure profile and time period (even if the pressure does not remain constant for this time period), by dividing the area under this new pressure profile with the area already calculated, and then multiplying by the known discharge rate.

Determining the Volume Lost Between Any Two Pressure Readings

Some of the above assumes that the measured release of water/fluid takes place either directly before an observed period of depressurisation, or that the pressure in the system is reset so that both the release and the observed depressurisation occur at similar pressures. Obviously it may not always be desired or possible to take the one reading directly after the other, or to re-pressurise the system between the two runs. This therefore raises the question, for a fixed system, with a suspected leak, whether, if we can measure the volume of fluid lost between two pressure readings, can we calculate how much fluid will be lost between any two other pressure readings?

To solve this the present inventors considered the following:

If discharging a volume of fluid $V_1$ from a system causes the absolute system pressure to fall from $P_{11}$ to $P_{12}$ and at a separate time, the pressure in the system is observed to fall from $P_{21}$ to $P_{22}$, what volume of fluid '$V_2$' has been discharged to cause this separate ($P_{21}$ to $P_{22}$ pressure drop?

It is known that the absolute pressure of a system is inversely proportional to the volume of air trapped in it, so we can say that $P=k/V$, where 'k' is a constant.

We assume that the volume of air present in the system at pressure $P_{11}$ is an unknown, called $V_{air1}$.

We thus can start with $P_{11}=k/V_{air1}$ and $P_{12}=k/(V_{air1}+V_1)$

Thus $V_{air}=k/P_{11}$

Thus $P_{12}=k/(kP_{11}+V_1)$,

Thus $k*P_{12}/P_{11}+P_{12}*V_1=k$

Thus $(1-P_{12}/P_{11})k=P_{12}*V_1$

Thus $k=P_{12}*V_1/(1-P_{12}/P_{11})$

Provided no air is allowed to enter or leave the system, 'k' will remain constant.

Looking then at the second pressure drop, with $V_{air2}$ being the volume of air in the system when it is at pressure $P_{21}$. It is again an unknown, but it will differ from $V_{air1}$:

As before we can start with $P_{21}=k/V_{air2}$ and $P_{22}=k/(V_{air2}+V_2)$

Thus $V_{air2}=k/P_{21}$,

Thus $P_{22}=k/(k/P_{21}+V_2)$

Thus $P_{22}*k/P_{21}+P_{22}*V_2=k$

Thus $P_{22}*V_{22}=k(1-P_{22}/P_{21})$

Thus $V_2=(1-P_{22}/P_{21})*k/P_{22}$

Where, as previously defined $k=P_{12}*V_1/(P_{12}/P_{11})$
Therefore, $V_2=P_{21}/P_{22}*V_1/(1-P_{12}/P_{11})*(1-P_{22}/P_{21})$
Which, multiplying through, comes to:

$V_2=V_1*(P_{11}*P_{12})/(P_{21}*P_{22})*(P_{21}-P_{22})/(P_{11}-P_{12})$.

If instead using gauge pressures, rather than absolute pressures, then the equivalent equation will be:

$V_2=V_1*((P_{11}+P_{atm})*(P_{12}+P_{atm}))/P_{21}+P_{atm})*(P_{22}+P_{atm}))*(P_{21}-P_{22})/(P_{11}-P_{12})$.

Where $P_{atm}$ is the atmospheric pressure.

Therefore, according to another aspect of the present invention there is provided a method for testing whether there is a leak in at least a part of a water system, comprising:
 closing all known water usage taps within the part of the water system to be tested;
 closing at least one stop cock or valve of the water system to isolate the part of the water system from its replacement water source (or sources), and any external replacement pressure source (or sources); and then
 a) detecting a first pressure $P_{21}$ within the isolated part of the water system, waiting a period of time t and then detecting a second pressure $P_{22}$ within the isolated part of the water system; and
 b) detecting a pre-release pressure $P_{11}$ within the isolated part of the water system, releasing a volume of water $V_1$ from the isolated part of the water system via a vent in the isolated part of the water system, before then closing the vent and detecting a post-release pressure $P_{12}$ within the re-isolated part of the water system;
 the method further comprising:
calculating an approximate leaked water loss $V_2$ by using the following equation:

$V_2=V_1*(P_{11}*P_{12})/(P_{21}*P_{22})*(P_{21}-P_{22})/(P_{11}-P_{12})$.

Here the pressure readings are absolute pressures. Where they are gauge pressures, the formula may be substituted with the following:

$V_2=V_1*P_{11}+P_{atm})*(P_{12}+P_{atm}))/((P_{21}+P_{atm})*(P_{22}+P_{atm}))*(P_{21}-P_{22})/(P_{11}-P_{12})$.

The leak rate can then be calculated by dividing V2 by time t, or with the correction described above for one or more of the previous aspects.

The above method, as before, can be used in either order (i.e. getting the two readings $P_{21}$ and $P_{22}$ could occur before or after the $P_{11}$, $P_{12}$, $V_1$ set of readings). Likewise, corrections for errors, as described above, can be used with this method. For example, allowances can be made for the system leaking at the same time as discharging a measurable volume of fluid. Ideally this might be done by carrying out the discharge of $V_1$ quickly, while taking a far longer amount of time between measuring points $P_{21}$ and $P_{22}$—ideally a time-factor of more than 10, so that the leaked volume between $P_{11}$ and $P_{12}$ is small relative to the measured discharge, or by adopting a more elaborate methodology as described below:

When plotting the pressures (y axis) over time (x axis), a total discharge volume is proportional to the area under the pressure curve. Hence, where the total discharge volume is $V_1$, the volume to be estimated is $V_2$, the recorded discharge volume is $V_R$, the area under the $P_{11}$ to $P_{12}$ pressure profile is area $A_1$ (see FIG. 13 for an example), the area under the $P_{21}$ to $P_{22}$ pressure profile is $A_2$ (again see FIG. 13 for an example), and a discharge constant is 'C', we can start with the following two formulas:

$V_1=V_R+A_1 \times C$ and $V_2=A_2 \times C$

Then, taking the earlier equation for $V_2$:

$V_2=V_1*((P_{11}+P_{atm})*(P_{12}+P_{atm}))/((P_{21}+P_{atm})*(P_{22}+P_{atm}))*(P_{21}-P_{22})/(P_{11}-P_{12})$ and by temporarily referring to the term
"$((P_{11}+P_{atm})*(P_{12}+P_{atm}))/((P_{21}+P_{atm})*(P_{22}+P_{atm}))*(P_{21}-P_{22})/(P_{11}-P_{12})$"
as 'B'.

We can say that $V_2=V_1*B$.
Hence $A_2*C=(A_1*C+V_R)*B$
Therefore $C(A_2-A_1*B)=V_R*B$
Thus $C=V_R*B/(A_2-A_1*B)$
And $C=V_R(A_2/B-A_1)$ Therefore, for any given pressure profile, the present invention allows an improved estimation of the total fluid discharge that occurs over that profile by using the equation:

$C \times$ area under the profile where C is $(A_2/B-A_1)$ and

B is $((P_{11}+P_{atm})*(P_{12}+P_{atm}))/((P_{21}+P_{atm})*(P_{22}-P_{atm}))*(P_{21}-P_{22})/(P_{11}-P_{12})$.

All of the previous workings monitor the pressure drop of a system due to a suspected leak and compare this to the pressure drop caused by the release of an additional, finite, measured volume of water. Furthermore, any additional leakage that occurs while the measured volume of water is discharged is either made sufficiently small that it can be discounted for the purpose of the estimation—for example by discharging the released volume of water relatively quickly compared to the time the leak is monitored, or is allowed for with additional calculations.

The present invention, however, considers another methodology, where a known additional leak in the system is used, whereby it becomes possible to compare the profile of the system pressure both before and after the additional intentional leak is set. According to this aspect of the present invention there is provided a method for testing whether there is a leak in at least a part of a water system comprising:
 closing all known water usage taps within the part of the water system to be tested;

closing at least one stop cock or valve of the water system to isolate the part of the water system from its replacement water source (or sources), and any external replacement pressure source (or sources); and then a) taking several recordings of the system pressure dropping due to a suspected leak to give a set of suspected leak recordings, and b) setting an intentional leak in the system and taking several recordings of the system pressure dropping due to the intentional leak in addition to the suspected leak to give a set of intentional leak recordings;

and comparing the two sets of recordings from steps a) and b).

Preferably the rate of the intentional leak is determined, either with a flow meter or by collecting it in a container for measuring its volume for a given time period shorter than the time the intentional leak is tested for.

Preferably the intentional leak recordings of step b) occur after the suspected leak recordings of step a).

Preferably no pressure reset is provided between sets of recordings, although as with earlier aspects, that is also possible.

The method may comprise fitting lines of best fit, or curves, to both sets of recordings and considering how much faster the pressure drops in the intentional leak recordings compared to the suspected leak recordings.

By using straight lines of the form y=a*x+b (or P=a*t+b), it is possible to compare the 'a' values for the two lines.

By using exponential decay curves of the form P=A exp^(-lambda*t), it is possible to compare the lambdas.

It is also possible to extrapolate the curves, as in previous aspects, to account for set-up changes between not intentionally releasing water and releasing water intentionally (or vice versa).

It is also possible to extrapolate the lines or curves—a process that is particularly useful for more complex curves to allow the angles of both lines to the time axis, or the pressure drops, for both curves to be compared from the same time-point on the graph—usually from where the known leak is set as it is the easiest to measure. FIG. 14 illustrates this approach. The ratio of intentional leak angle (or drop) "$\Delta_2$" to the suspected leak angle (or drop) "$\alpha_1$" will be the same as the known leak ($V_R$+ the unknown leak $V_L$ divided by the unknown leak $V_L$. In other words:

$$\Delta_2/\Delta_1 = (V_R + V_L)/V_L$$

$V_L$ can thus be calculated.

According to another aspect of the present invention there is provided a method for testing for a leak in a part of a vented water system that has a header tank:

closing all known water usage taps within the part of the water system to be tested and isolating that part of the water system from its header tank such that an overflow pipe above the normal water line provides the only installed vent for the part of the water system to be tested;

attaching one end of a u-tube manometer 32 to the overflow pipe, such that the liquid of the manometer seals the overflow pipe, the other end of the manometer then being open to the environment; and observing whether the liquid in the manometer moves, movement suggesting the presence of a leak.

Preferably the liquid in the manometer is water.

The u-tube manometer can be a length of silicon or rubber tube part-filled with a little water.

Preferably the overflow pipe is for feeding over-pressurised hot water from a hot water cylinder back into the header tank for re-use.

Preferably the part of the water system is isolated from its header tank by a valve below the header tank, or by a bung in the bottom of the header tank.

Preferably, upon detecting the suggestion of a leak, the method comprises the step of measuring the rate of vertical movement v of the liquid in the manometer, the method then determining a leak rate as v*A, where A is the cross sectional area of the manometer.

Preferably the water systems are in a building. Typically the building will be a house, an apartment, an office, a warehouse or a factory.

According to a further aspect of the present invention there is provided a method for estimating a position or height of a leak within at least a part of a water system, the method comprising the use of two pressure sensors and a pump, wherein one of the two pressure sensors is located towards a top of the part of the water system being tested and the other pressure sensor is located towards a bottom of the part of the water system being tested, the pump being for enabling maintenance of a volume of air above the water level within the water system at a pressure greater than atmospheric to make the water in the water system pressurised, the method comprising:

closing all known water usage taps within the part of the water system to be tested;

isolating the part of the water system (50) from its replacement water source;

checking the pressures on the sensors and elevating the pressure of the volume of air if needed to pressurise the water system; and determining the difference between the pressures sensed by two pressure sensors to determine a head of the water within the system, the head representing the height of the water above the second sensor;

intermittently venting water out of the water system and measuring the pressures sensed by the two pressure sensors once the vents are closed to allow a subsequent head to be calculated; and re-ascertaining the differences between the pressures to calculate the new head;

wherein if the detected pressures start to drop faster than normal whilst the system is isolated after one such intermittent or periodic venting of a volume of water, the location of a leak has been identified as at or just above the top of the water level, the height thereof being represented by the head just calculated.

The head is representative of the height above the lower sensor as the head is the pressure dictated by gravity. To calculate the height above the second sensor, the head in kPa should be divided by a gravity constant—usually about 10, or 9.81 m/s$^2$, depending upon the altitude, or ambient pressure, to give a distance in meters.

In a vented water system, the above method may also use a pressure buffer, a pressure release valve or an inflatable device such as a balloon, connected to the volume of air, that can burst or open should the pressure in the volume of air be excessive—this prevents bursting of the pipe joints or pipe connections in that system, which joints or connections may be less resistant to bursting than those found in a normally mains pressurised water system. It also provides a second benefit—a reservoir of higher pressure air. This helps to ensure that the leak continues to occur even when head height is very near the leak height (whereby the head alone might otherwise no longer be able to drive the leak).

Preferably this method is used to schematically map a building's plumbing system. For this purpose the head is monitored as well. If the head remains constant for a sequence of water releases, the method will establish that the water system at that head comprises horizontal pipework. However, if the head drops during a sequence of water releases, then the method establishes that through that range of heads the water system comprises vertical pipework.

Preferably the vented water is vented as units of water. Preferably the units are fixed or measured volumes of water. The unit may instead be an approximated volume, determined by a timed duration of release.

With the information regarding the volume of water—approximated or measured, the method can then also approximate the cross sectional area of the vertical pipework at a given head by dividing the approximated or measured volume of water vented in a particular sequence by the change of head height measured. From this, as pipes tend to have a constant diameter, and given that pipes also tend to have standardised diameters, the number of pipes can be estimated.

Furthermore the method can approximate the length of horizontal pipes located in a horizontal stretch by dividing the approximated or measured volume of water vented by the expected cross-sectional area of the pipework. As pipes tend to be standardised, likely cross sectional areas can be used. Furthermore, visible pipework within the building can allow more reasoned conclusions to be drawn regarding the type of pipe that might be present, and thus their individual cross sectional areas.

The method can also monitor the head between each venting of a volume of water, in particular by looking for a drop in head when no water is being vented from the system. If after the initial release of water, the head is still slowly dropping, the water level is above the leak, so the testing should continue. However, if the head instead stops falling, the leak can be concluded to be in the horizontal section.

Throughout the method, it is preferred that if the measured pressure—e.g. at the top sensor, drops below a set minimum, the pump be used to pump more air in at the top as the pressure in the section being tested needs to exceed the static head pressure.

Similarly, if the pressure rises above a set maximum, e.g. due to excessive use of the pump, the pump or a pressure release valve should be allowed to let air out of the water system to avoid bursting joints of the water system, or to avoid causing other leaks to appear. The balloon, when fitted, can also provide such protection.

The present invention also provides an automated method for mapping at least a part of a water system, the method comprising the use of two pressure sensors and a pump, wherein an upper of the two pressure sensors is located towards a top of the part of the water system being tested and a lower of the two pressure sensors is located towards a bottom of the part of the water system being tested, the pump being for enabling maintenance of a volume of air above the water level within the water system at a pressure greater than atmospheric to make the water in the water system pressurised, the method comprising:

closing all known water usage taps within the part of the water system to be tested;

isolating the part of the water system (50) from its replacement water source;

checking the pressures on the sensors and elevating the pressure of the volume of air if needed to pressurise the water system; and determining the difference between the pressures sensed by two pressure sensors to determine a head of the water within the system, the head representing the height of the water above the lower sensor;

intermittently venting water out of the water system and measuring the pressures sensed by the two pressure sensors once the vents are closed to allow a subsequent head to be calculated; and re-ascertaining the differences between the pressures to calculate the new head;

wherein if the head remains constant for a sequence of water releases, the method will establish that the water system at that head comprises horizontal pipework, and if the head drops during a sequence of water releases, then the method establishes that through that range of heads the water system comprises vertical pipework.

Preferably the method continues releasing water and measuring pressures until the head is measured to be zero.

As with the previous method, preferably the vented water is vented as units of water. Preferably the units are fixed or measured volumes of water. The unit may instead be an approximated volume, determined by a timed duration of release.

With the information regarding the volume of water—approximated or measured, the method can then also approximate the cross sectional area of the vertical pipework at a given head by dividing the approximated or measured volume of water vented in a particular sequence by the change of head height measured. From this, as pipes tend to have a constant diameter, and given that pipes also tend to have standardised diameters, the number of pipes can be estimated.

Furthermore the method can approximate the length of horizontal pipes located in a horizontal stretch by dividing the approximated or measured volume of water vented by the expected cross-sectional area of the pipework. As pipes tend to be standardised, likely cross sectional areas can be used. Furthermore, visible pipework within the building can allow more reasoned conclusions to be drawn regarding the type of pipe that might be present, and thus their individual cross sectional areas.

Throughout the method, it is preferred that if the measured pressure—e.g. at the top sensor, drops below a set minimum, the pump be used to pump more air in at the top as the pressure in the section being tested needs to exceed air pressure.

Similarly, if the pressure rises above a set maximum, e.g. due to excessive use of the pump, the pump or a pressure release valve should be allowed to let air out of the water system to avoid bursting joints of the water system, or to avoid causing other leaks to appear. The balloon, when fitted, can also provide such protection.

The present invention also provides a system for carrying out any one or more of the above methods.

The present invention also provides a pressure sensor module comprising a pressure sensor and a venting tap, the module further comprising a threaded cap—preferably sized to fit a washing machine attachment point, and tubing to connect the pressure sensor and venting tap with a water system of a building through the cap. Although reference is made to a washing machine attachment point, whereby the thread is a female thread, other standard attachment points might be used, such as valve attachments of a domestic tap, whereby the threaded cap would be a male fitting for fitting into that valve attachment point.

Preferably the sensor module also comprises a transmitter to transmit pressure readings taken by the sensor external of the module, and/or water volume indicators.

Preferably the transmissions are wireless transmissions.

The venting tap may be controlled by an actuator that is driven by a processor or computer.

The pressure sensor module may also comprise a receiver for receiving external pressure sensor readings transmitted from a separate pressure sensor—e.g. one at a top of a water system being tested, with the pressure sensor module being located at the bottom of the water system being tested.

Preferably the transmitter and receiver, the actuator and a control board therefor, the pressure sensor, the venting tap and the tubing, or flow channels, with the threaded cap for attaching to a washing machine attachment point, are assembled into an integrated assembly for sale as a single unit either alone, or in a kit comprising also a sensor and pump assembly for an upper end of a part of a water system to be tested or mapped therewith.

Preferably the sensor and pump assembly is also an integrated unit, with a receiver and transmitter, with a control board for the pump.

The kit may additionally comprise an app or program for a computer, tablet or smartphone such that the system can be monitored or controlled on the computer, tablet or smart phone.

A system comprising the sensor module as defined above, and the separate pressure sensor, both connected to a water system to be tested or mapped is also provided. The pressure sensors, or transmitters attached thereto, may transmit pressure information to a control or system processor for displaying results on a screen. The control or system processor may also send signals to a control board for an actuator of the venting tap, for automating the pressure sensing and water releasing process during a test or mapping process, such as those described above.

Alternatively or additionally the receiver may be for receiving control signals for selectively triggering the venting tap to release water from a connected water system when in use.

These and other features of the present invention will now be described in greater detail, purely by way of example, with reference to the accompanying drawings in which.

Figure 1:
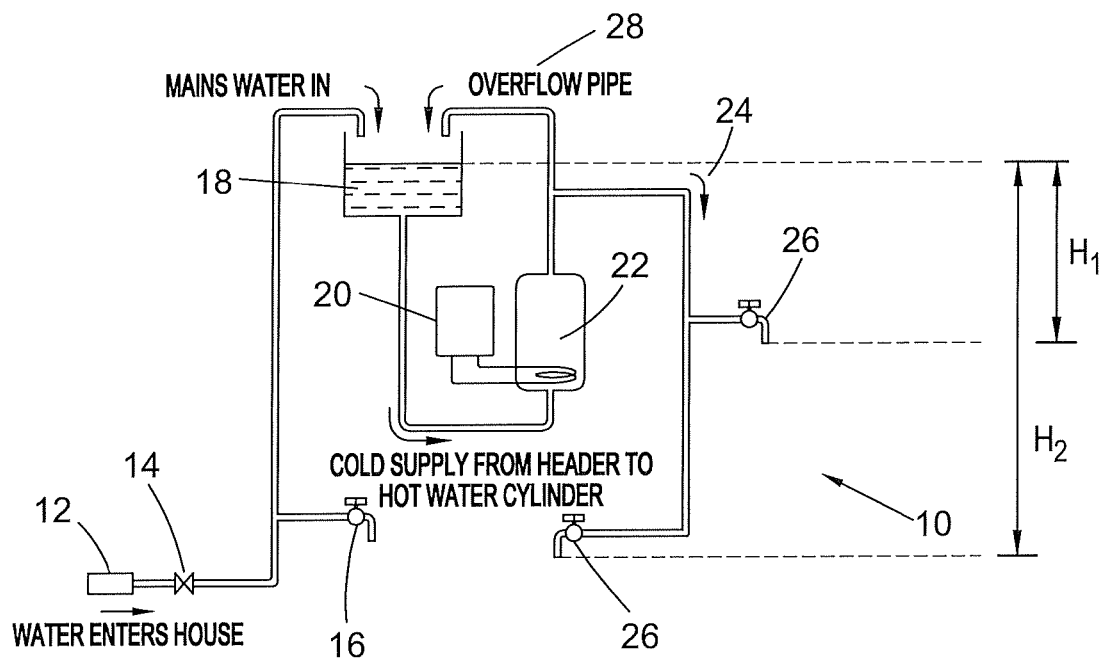
FIG. 1 shows an example of a simple vented water system for use in a building.

Referring first of all to FIG. 1 there is disclosed is a vented water system 10 supplied with water from a mains pressure by a mains water supply 12. The mains water supply 12 can be controlled on and off relative to the system 10 by a stop cock 14. The mains supply 12, with the stop cock 14 open, can supply water to one or more cold tap 16, such as one in a kitchen, plus also to a header tank 18—usually located in a loft or attic of the building. Its height relative to any tap fed by the system, such as hot water taps 26, i.e. those other than any mains fed taps 16, define the pressure of the system at that tap, i.e. its head.

The header tank 18 supplies stored water via a pipe to a hot water cylinder 22, usually at or near the bottom of that cylinder 22. That transferred water is then heated by a boiler 20—often an immersion heater, or boiler coil for indirect heating. The hot water can then be taken from the cylinder 22, usually from upper parts thereof as shown. Here it is shown to branch off an overflow pipe 28 for the cylinder 22, as is also commonly done.

The hot water pipe leads to hot water taps 26 elsewhere within the building.

Figure 2:
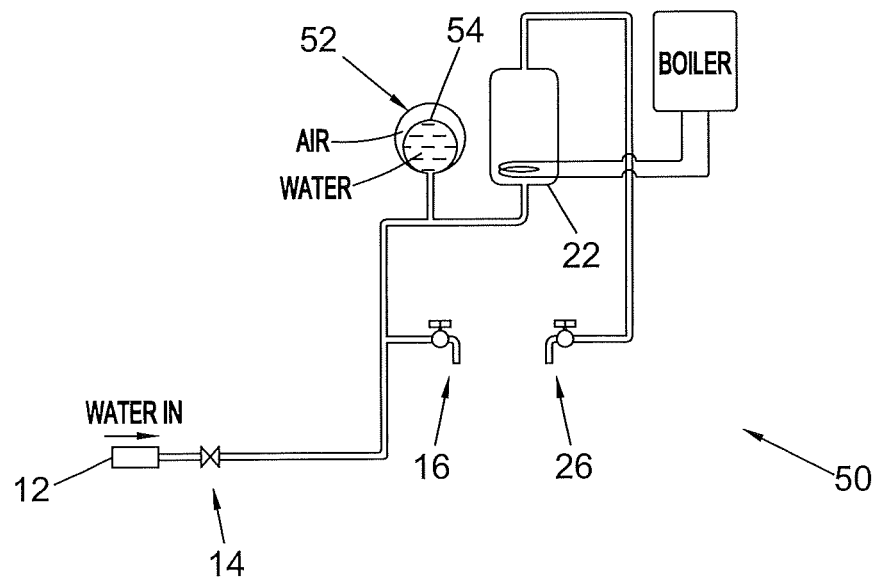
FIG. 2 shows an example of a simple unvented or "pressurized" water system for use in a building.

Referring next to FIG. 2 there is disclosed instead a pressurised or unvented water system 50. Such systems can also be referred to as a sealed water system. This alternative form of water system 50 is held at mains pressure effectively throughout the system 50, rather than relying on the head of a header tank 18 as the feed pressure for the hot taps 26.

The pressure in this system 50 is maintained at the mains pressure by its connection to a mains water supply 12. It can be isolated from the mains water supply 12 by a stop cock 14, as could the vented system. It can also have cold taps between that stop cock 14 and its hot water cylinder 22. Furthermore the hot water cylinder 22 is still heated by a boiler 20—perhaps via a coil in the tank, or with an emersion heater. However, in place of the overflow pipe 28, there is instead an expansion vessel or 'EV' 52 which contains a bladder 54 surrounded by air, and containing the "overflow" (an over-feed or buffer) of water, which air is compressed to a greater or lesser extent as the pressure in the system increases or decreases due to either fluctuations in the main pressure, or due to the heating of the water in the cylinder, or the release of water through the hot or cold taps 16, 26. A steadied water flow, and an avoidance of explosive or excessive pressures within the cylinder 22, can thus be achieved (the EV 52 can have a pressure release valve for releasing excessive pressures).

With either system 10, 50, water may instead be heated on demand by a combi-boiler, avoiding the need for a hot water cylinder, although combi-boilers are more usually used in unvented systems.

Determining Leak Rate on a Pressurised System

The first aspect of the present invention provides a method for each of the above systems that allows a detection or investigation/testing of a leak. In addition to detecting or testing a leak, however, the present invention can also attempt to determine or approximate a leak rate.

The inventors have realised that a rate of depressurisation alone will not give us an actual leak rate (in terms of how much water is leaking over a given time period). After all, if a lot of air is present, a relatively large leak will only lead to a small depressurisation. Conversely, if only a small amount of air is present, even a small leak can lead to a large depressurisation. The explanation behind this is as follows:

Boyle's law states that:

Pressure is proportionate to 1/Volume

The relationship is only approximate as it depends upon the amount of heat that is created and removed from the system, but is sufficiently accurate for the purposes of this analysis.

From this starting point, imagine a leak causes a certain volume of water '$V_L$' to leave a system over a time T. Since water is essentially incompressible at mains water pressure, the departing water will 'stretch' any air pockets in the system, causing the air to increase in volume equal to the displaced $V_L$.

The inventors therefore considered how to estimate the leak rate, based on observations of pressures in a water system over time:

Where the initial pressure is $P_0$ and the second pressure, at time t, is $P_1$, we can start with the following equations:

Initial pressure=$P_0$=$k/V_{air}$

Pressure after leak has released a volume of water (i.e. after time $t$)=$P_1$=$k/(V_{air}+V_L)$ Hence: $k=V_{air}*P_0=(V_{air}+V_L)*P_1$ Thus $P_1=P_0*V_{air}/(V_{air}+V_L)$ On the one hand, if $V_L$ is small compared to $V_{air}$, $P_1 \approx P_0$ On the other hand, if $V_L$ is more substantial, $P_1$ will be notably smaller. For example: if $V_L=V_{air}$, then $P_1=P_0*½$ Unfortunately there are two unknowns; $V_L$ and $V_{air}$. This means that the volume of leaked water $V_L$ cannot be determined unless the volume of air in the system is known, and that volume will vary substantially depending upon the system type (vented or unvented, and the state of the expansion vessel). Furthermore, it cannot directly be measured.

Hence a second equation is needed to solve the problem.

The first aspect of the present invention provides the means for providing the solution: by releasing a fixed volume of water '$V_R$' from the system (e.g. by filling a beaker from a tap), and recording the new pressure $P_2$ after this known volume of water has been released from the system, we can arrive at a useful equation:

$P_2=k/(V_{air}+V_L+V_R)$

Thus $k=(V_{air}+V_L+V_R)*P_2$,

We also know that $k=(V_{air}+V_L)*P_1$ and $k=V_{air}*P_0$ and consequently that $V_{air}*P_0=(V_{air}+V_L)*P_1$ So: $(V_{air}*P_0)/P_1=V_{air}+V_L$ $\therefore (P_0/P_1-1)*V_{air}=V_L$ $\therefore V_{air}=L_L/(P_0/P_1-1)$ And $V_{air}*P_0=(V_{air}+V_L+V_R)*P_2$
This gives us:

$V_L*P_0/(P_0/P_1-1)=(V_L/(P_0/P_1-1)+V_L+V_R)*P_2$

Figure 3:
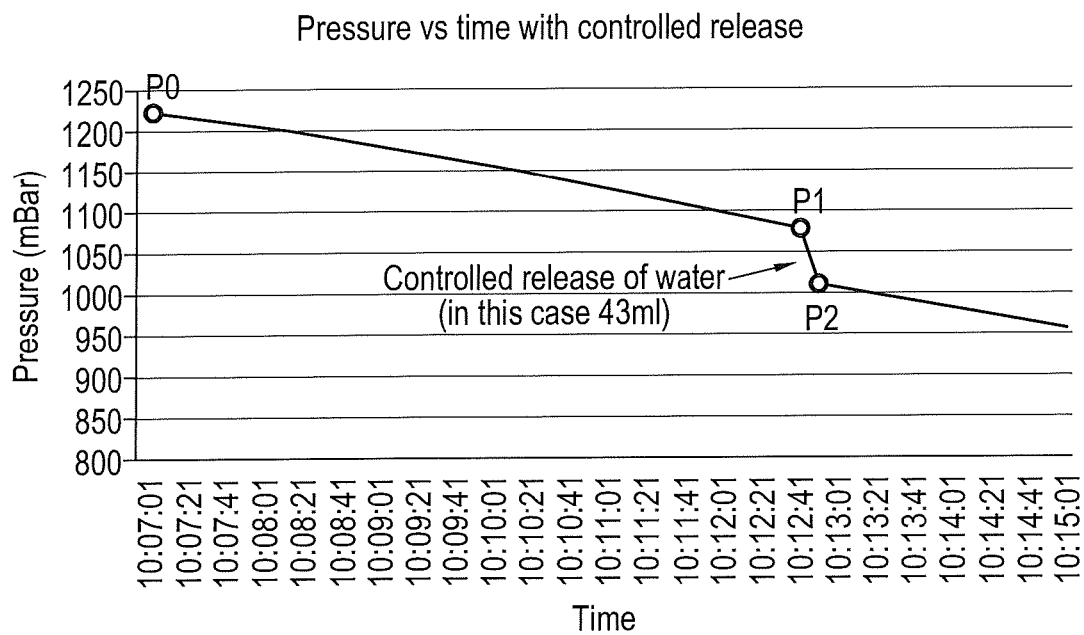
FIG. 3 shows a pressure versus time graph illustrating the drop in pressure in a water system over time, and a step drop due to a controlled release of a small volume of water.

Further, $V_L*P_0/(P_0/P_1-1)=V_L*P_2(1+1/(P_0/P_1-1))+V_R*P_2$ $\therefore V_L*(P_0/(P_0/P_1-1)-P_2(1+1/(P_0/P_1-1)))=V_R*P_2$ $\therefore V_L*(P_0-(P_2*P_0)/P_1)/(P_0/P_1-1)=V_R*P_2$ $\therefore V_L*(P_0*P_1-P_2*P_0)/P_1*P_1/(P_0-P_1)=V_R*P_2$ $\therefore V_L*P_0(P_1-P_2)/P_0-P_1)=V_R*P_2$ We thus finally arrive at the volume leaked out $V_L=V_R*P_2(P_0-P_1)/(P_0(P_1-P_2))$ Using this formula, and the example of the pressure readings taken from FIG. 3, a reasonably accurate leak rate ($V_L$/t) can be determined from the initial pressure reading $P_0$, the pressure reading $P_1$ just before the release of the controlled volume of water $V_R$ (i.e. after time t) and the pressure reading $P_2$ just after the controlled volume of water was released, as set out in Table 1:

TABLE 1

| Data | reading | Workings: |
| --- | --- | --- |
| $V_R$ | 43 ml | $V_L = V_R * P_2 (P_0 - P_1)/$ |
| $P_0$ | 1221.2 mBar | $(P_0 (P_1 - P_2))$ |
| $P_1$ | 1081.4 mBar | $V_L$ = 69.2 ml |
| $P_2$ | 1009.47 mBar | t = 5 ⅔ mins. Thus leak/min = 12.2 ml |

Figure 4:
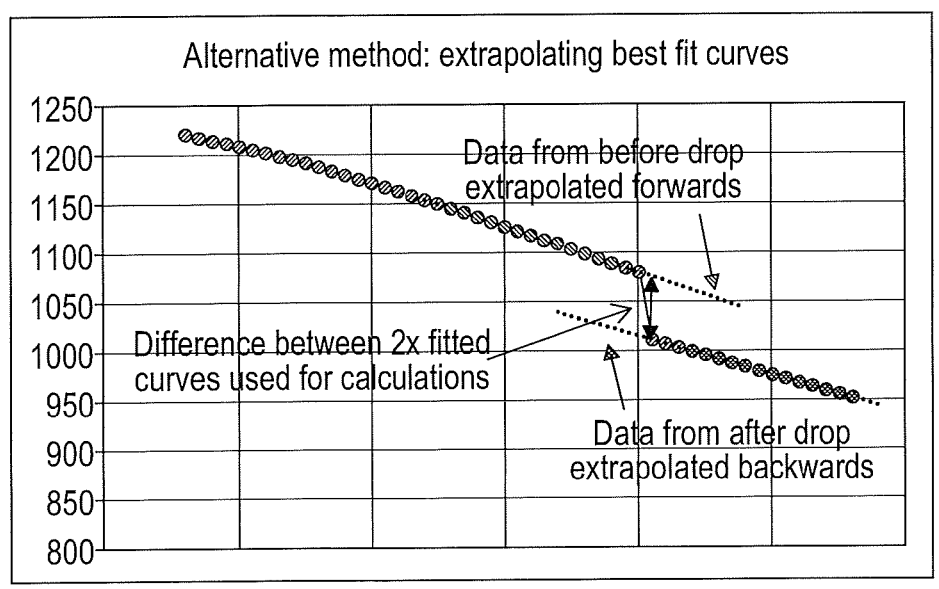
FIG. 4 shows an extrapolated best fit curve for the pressure drop over time.

An alternative way to achieve a similar result is to fit a curve or a line to the pressure trace before the water release and a separate one after the water release using a method such as least squares or similar. These can be extrapolated across the period of the water release, and the vertical distance between the two curves calculated at the release point. This has the advantage that it can be smoothed over shock waves in the pressure that can occur during or for a while after the release. It can also allow for a delay in the sampling period of the pressure sensor, for example if the sensor samples at 5 second intervals, the point $P_2$ may not be exactly known as it could be 4 seconds after the actual release, or the release may coincide with taking the sample and a misleadingly low pressure is measured due to a low pressure wave passing the pressure sensor. As such, data points $P_0$, $P_1$ and $P_2$ are calculated, rather than measured, from the best fit curves. An example using such extrapolation is given in FIG. 4.

To carry out these "first" aspects of the present invention a useful approach to take follows the following steps:
1) Ensure all taps etc. within the pressurised section being tested are off so that no intended water-use is occurring.
2) Attach a pressure sensor to the pressurised part of the water system.
3) With the system at mains pressure, turn off the stopcock to disconnect from the mains pressure supply.
4) Commence (or continue) taking pressure readings from the pressure sensor.
5) Leave the system alone for a period of time, optionally continuing to take pressure readings, this step involving taking at least one additional pressure reading prior to the next step.
6) Release a small volume of water ($V_R$) out of the system, usually into a measuring beaker so that the volume taken is measured.
7) Take at least one further pressure after releasing the volume of water.

8) Establish from the pressure readings a first pressure value $P_0$ as a starting pressure at a given time t before the release of the water;
9) Establish from the pressure readings a second pressure value $P_1$ representing the pressure just before the water was released;
10) Establish from the pressure readings a third pressure value $P_2$ representing a the pressure just after the release of water;
11) Feed the values of $P_0$, $P_1$, $P_2$ and $V_R$ into the following equation for calculating $V_L$:

$$V_L = V_R * P_2(P_0 - P_1)/(P_0(P_1 - P_2))$$

thus estimating a total volume of water that has leaked out ($V_L$).

12) Divide this value $V_L$ by the amount of time in minutes (t) between $P_0$ and $P_1$ to determine the leak rate per minute.

It is possible also to do the test without the calculations, whereby data is sourced for evaluation.

It is also possible to take the pressures either side of the release of water, and the release of water, before taking the readings during the time t, and even to reset the pressure between each set of readings. The above, however, describes a preferred embodiment.

Commonly the additional readings at steps 5 and 7 are taken within 5 seconds, or perhaps within 10 or 20 seconds or even 1 minute of the start and end of the release of water, respectively. Such short time intervals will give accurate results in most instances. Longer intervals may degrade the accuracy, although results may still be adequately accurate as a calculated approximation of the actual leak rate.

If the leak rate is below a pre-determined minimum, a decision can be taken that the system is not currently leaking at a rate that would lead to concern. If it exceeds such a minimum, however, it is determined that the leak needs further investigation, and subsequently a likely repair.

Commonly the pressure sensor would be applied at a convenient take-off point, such as a standard washing machine attachment point, or by removing a valve mechanism from inside a tap and replacing it with a suitable fitting for connecting a pressure sensor. Suitable pressure sensors could be electronic pressure sensors and the appropriate fittings are readily available for most standard size taps or washing machine attachment points.

The above method will generally be preferred to be used on unvented, i.e. pressurised systems. However, it can also be used on a header tank-fed side of a vented system 10, although the header tank would want to be thoroughly isolated, e.g. by closing a valve thereof.

It is also to be appreciated that the method can be adapted in line with the various variants discussed above in the statements of invention.

Referring now to a second aspect of the present invention a further approach for testing for leaks is provided.

In a hot water system, even when heating up a vented system, the pressure does not rise significantly, as vented hot water systems 10 are all equipped with a basic safety feature of the overflow pipe 28 from the hot side of the cylinder 22, that empties any overflow back into the header tank 18. This means that as the hot water cylinder 22 heats up, rather than experiencing a potentially dangerous increase in pressure, excess hot water is simply driven up the overflow pipe 28 and back into the header tank 18, ready to be re-used later.

Figure 5:
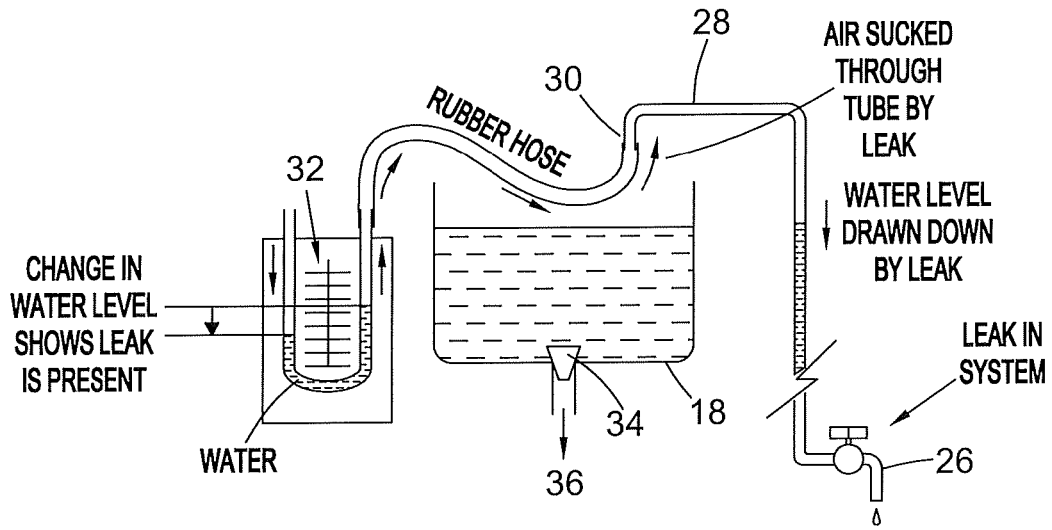
FIG. 5 shows a manometer being used to detect a leak in a vented water system.

Determining whether there is a leak on such a vented hot water system 10 offers a different approach for the invention. It instead involves the second aspect of the present invention, namely attaching a gas manometer 32 to the outlet 30 of the overflow pipe 28, and then putting a bung 34 in the outlet 36 of the header tank 18, both as shown in FIG. 5. As header tanks 18 are usually equipped with easily removable lids, for ease of inspection, inserting a bung 34 is an easy, if cold (due to the tank being deep and filled with cold water) task.

Step by step instructions for following the second aspect of the present invention can thus be as follows:
1) Ensure all taps etc. are off so that no intended water-use is occurring.
2) Bung the outlet of the header tank 18
3) Fill a gas manometer 32 with a little water.
4) Attach one end of the manometer, for example by a length of rubber tube, to the outlet 30 of the overflow pipe 28
5) Keep open or open the other end of the manometer such that it is open to the atmosphere.
6) Observe whether the water in the manometer moves. If the water moves there is a leak.

To continue to a preferred aspect of this second aspect of the invention—determining the rate of any leak, the operator can further do the following:
7) Measure the rate of vertical movement of the water in the manometer, v. The leak rate is v*A where A is the cross sectional area of the manometer tube.

If the water does not move in the manometer, check that all connections are secure by setting a slow drip on a hot water tap. If the water now starts to move, there is no leak.

If it still does not move, check connections and try again.

Having identified the presence of a leak, it is another aspect of the invention (the third) to find it. Prior art approaches tended to take a long time: In theory, water would leave the system at the leak point, causing pressure in the system to fall, until it finally reached equilibrium when the only pressure remaining in the system was that exerted by the 'head' of water sat above the leak. The final location of the leak could thus be determined as this process was happening by extrapolating the pressure vs time curve caused by the leak. In addition to this taking too long, this also had the problem that some leaks only open at high pressure, closing up as the pressure dropped, whereby false locations would be identified. Furthermore, even with a relatively fast leak and a good curve, extrapolating the curve forward may give the location of some flat pipework in the system rather than the leak height itself.

The third aspect of the invention therefore serves to find the location of the leak more positively, and more quickly.

According to this third aspect of the present invention the method uses two pressure sensors—one located at the top of the pipework being tested and the other at the bottom, along with a pump to hold the system at a pressure in excess of the head thereof. In essence, the difference between the two sensors indicates the height of water remaining in a system, i.e. the "head". This aspect also uses the knowledge that pipes in a building are generally either vertical or horizontal (or a bend) as building regulations, or good plumbing practice, typically require that arrangement.

With the invention, air is pumped into the system at the top, near the upper pressure sensor, in order to hold the system at a relatively constant high pressure—higher than the pressure arising just from the height of the water therein. In an unvented system this works as stated as the system is designed to operate at such elevated pressures. For a vented system, however, a balloon is optionally added as a precaution as vented systems in normal use will tend to be subjected to lower pressures than an unvented system as they generally only experience the gravity head of the header tank, not mains pressure. Hence it is prudent during testing to limit the pressure as pressures significantly above normal may create additional leaks. If the system is over pressurised, the balloon will burst, depressurising the system immediately.

Figure 6:
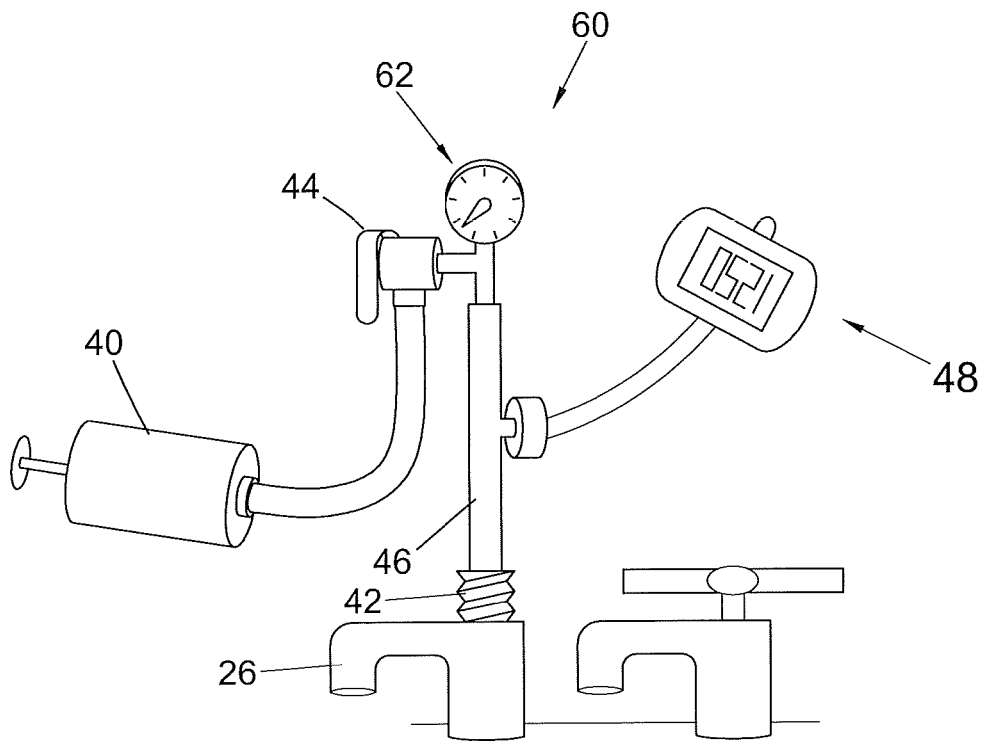
FIG. 6 shows a pump and second pressure meter for attachment at an upper part of a building when undertaking a method in accordance with an aspect of the present invention

Referring to FIG. 6, there is shown an example of a possible upper sensor assembly 60 for use at an upper pressure sensor location—in this case attached to an upstairs hot tap 26. It has a manual pump 40, which can be a bicycle pump with a connector 44 that attaches to a manifold assembly 46 of the upper sensor assembly 60. The manifold also has an attachment 42 that connects into the inside of a tap (once the valve of the tap 26 is removed)—usually by having a thread to match a valve-receiving thread inside of the body portion of the tap, and a T branch 66 that connects to a digital pressure gauge 48. Other forms of pump, gauge or manifold arrangement can likewise be used.

The gauge may be provided with a digital readout as shown, or there can be an analogue one 62—as also shown extending elsewhere from the manifold assembly 46. Ideally, however, the gauge is arranged to transmit readings to a processor for allowing automated processing, as explained further below.

Figure 7:
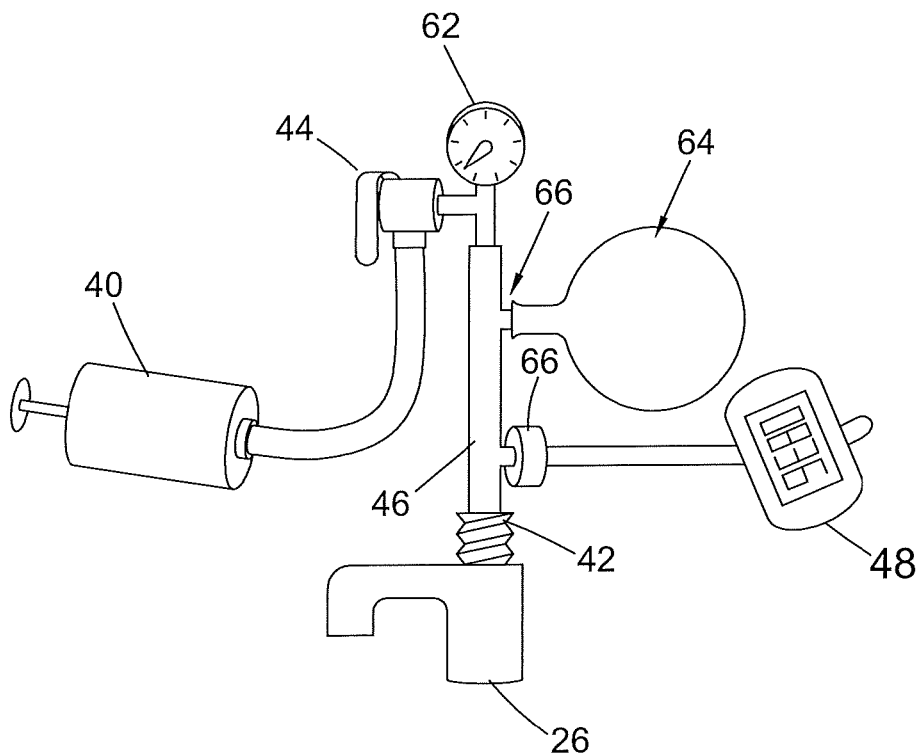
FIG. 7 shows a modified version of the assembly in FIG. 6, fitted with a balloon for better security when used on a vented water system.

Referring next to FIG. 7, a variant is shown instead for a vented system—it having the aforementioned balloon 64 fitted to it on a second T branch 66.

Figure 8:
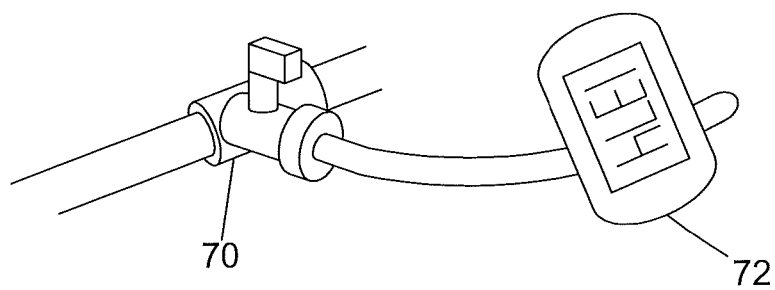
FIG. 8 shows a pressure sensor mounted at a washing machine attachment point, for example at a lower position of the building than the arrangement of FIGS. 6 and 7.

Referring next to FIG. 8, a lower pressure sensor is shown, in this instance instead fitted to a standard washing machine attachment point 70. The lower pressure sensor 72 in this embodiment has a pipe with a threaded end for screwing onto that washing machine attachment point 70. The pressure sensor is like the one of FIG. 6 and FIG. 7 in that it is digital with the ability to transmit its reading to a processor. Other pressure gauges are also possible, as would be alternative mounting positions (e.g. another tap, albeit probably a downstairs one.

The process of locating the leak using this aspect of the present invention is as follows:

Water is tapped off at the bottom of the system (to speed up the detection process), preferably in fixed volumes. At every stage after a volume of water (fixed or otherwise) is progressively tapped out of the system or section being tested, by opening a tap at the bottom and closing it again, readings are taken from the two pressure sensors (once the tap is closed again). The difference between the two pressure sensors is calculated to give a reading of the "head". The following analysis is then performed between the heads detected following each tapped volume:

1) If the "head" stays constant relative to the previous reading, i.e. after tapping off a volume, the pipework is flat at the point where the top of the water within the system is located—let more water out and retest.
2) If the "head" falls, the pipework is assumed to be vertical (or going around a downward facing joint).
   a. If this is the first "vertical" detection after a horizontal part, pause the water release and monitor the "head" to see if the head is slowly falling.
      i. If it is still slowly falling, the water level is above the leak location—let more water out and retest
      ii. If it has stopped falling, reference information for locating the leak has been obtained—the leak is in the horizontal section, or more likely in a branch or junction of the plumbing that is connected to this horizontal section of pipework (junctions, or water using devices that may be located on a branch of the pipework are more likely to fail than the pipe itself).
   b. Air escapes faster from a leak than water and causes a system to depressurise noticeably faster. If the pressures (the readings, not the difference between them) suddenly start falling faster than accountable by the removed water, the leak has been found—it is between current head height and the previous head height
   c. If neither a)ii) nor b) apply, let more water out and retest.
3) If the pressures drop below a set minimum, pump more air in at the top as the pressure in the section being tested needs to exceed the head pressure.
4) If the pressures rise above a set maximum, let air out at the pump to avoid bursting joints of the system, or causing other leaks to appear.

This process can thus ascertain the height above the bottom sensor that the leak is located, and the direction in which the pipe is most likely running, whereby its location should be easier to identify.

A useful side-effect of the above process is a fourth aspect of the invention—it can also be used to "map" the water system in a building. By measuring how much the head falls when a fixed volume is released from a vertical pipe run, the cross sectional area of the pipework in the system at that height, and thus also most likely the diameter of pipework (or number of pipes) at that height, can be ascertained as different diameters have fixed cross sectional areas, whereby for the height change there will be a predetermined volume (as the pipes are typically horizontal or vertical as mentioned above). Furthermore pipes tend to have standard sizes, thus allowing few permutations to account for any given calculated area. As a result, as water is let out, from the readings taken, the approximate structure of the pipework can reveal itself.

For example, the head might constantly fall between 5 metres and 2.8 metres, indicating a vertical section of pipe. It may then stay constant while a volume of water equivalent to 3 metres of horizontal pipe is released, before then starting to drop again. This could thus represent a horizontal pipe run occurring in the ground floor ceiling, perhaps serving different appliances in a first floor bathroom, and thus with one or more vertical run above it, say into the taps or shower.

According to a fifth aspect of the present invention it is also possible to automate the water release. This aspect can thus be beneficial for each of the first, third and fourth aspects described above.

Accurate volumetric dispensers exist. However they are expensive. The present inventors desire to provide a system for use by plumbers, and thus making the system less costly is beneficial as plumbers will be more likely to invest in an affordable system.

The inventors realised that the degree of accuracy provided by accurate volumetric dispensers is not necessary for estimating an approximate leak rate. Instead an approximation is enough.

They also realised that when dealing with a leak, internal pressure within the system will be constantly dropping as the leak continues.

When deliberately releasing water from a system, the higher the pressure within the system, for a given vent of a constant size, the faster the water will be released. However, when releasing small volumes of water from a system that contains a fair amount of air, the internal pressure can be approximated as remaining constant during the release of a small volume of water. Thus a relationship between internal pressure and flow rate can be assumed as follows:

Water release rate≈f(Internal pressure)

Figure 9:
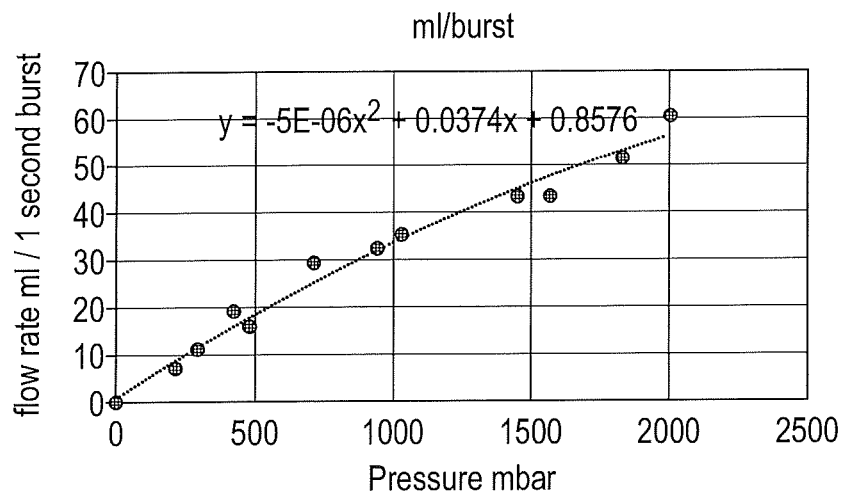
FIG. 9 illustrates how the pressure within the water system dictates the flow rate of water from the system when opening a vent in the piping, such as a tap.

(An empirical map of the relationship between volume dispensed per second through a vent due to the pressure of a test system versus the pressure of the test system is shown in FIG. 9. Although non-linear, it is close to linear.)

If the orifice that the water is released through is substantially smaller than the diameter of the pipes in the main system, the friction losses in the rest of the pipework become negligible compared to the losses through the orifice, so the flow rate can then also be assumed to be roughly the same at a given pressure, regardless of the pipework in the rest of the system.

This relationship between pressure and flow can therefore be found experimentally and converted into a table or function that maps flow rate as a function of pressure for a particular vent. Thus, to release a known (small) volume of water, the release mechanism can be triggered simply to open for a set amount of time, calculated from the flow rate versus pressure graph.

Taking that assumption, and using it in an automated process for testing a water system for leaks, and/or leak rates, the process can constantly and automatically refine or adjust itself: the process, via a computer or processor, can, among other things, time how long the actuator actually was open to determine the volume of water removed, measure whether the internal pressure dropped enough to impact water release rate and thus re-estimate how much water it actually released, and/or to vary the release time period next time, and (when being used with the third or fourth aspects of the present invention) to control the pump to re-pressurise the system if needed. The automated process can thus derive any adjustments needed from the detected pressure in order to more accurately release water in subsequent bursts, and to maintain the test apparatus' functionality.

Figure 10:
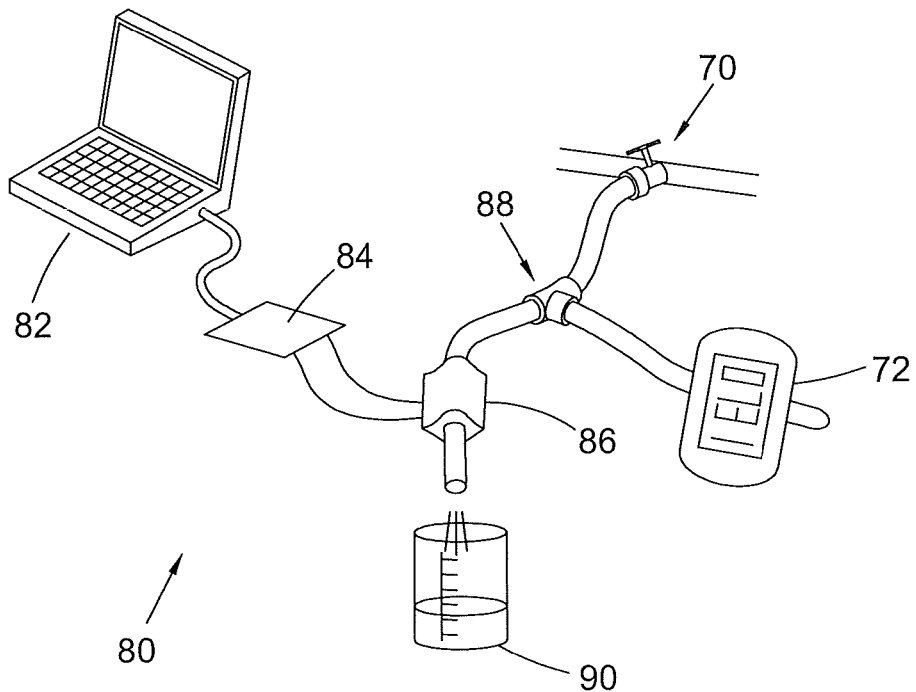
FIG. 10 shows a basic automated arrangement for implementing aspects of the present invention.

Referring next to FIG. 10 a proposed set-up 80 is shown. It comprises a computer 82 to provide processing of pressures detected by, in this instance, the single pressure gauge 72 that branches off a washing machine attachment point 70 that is located downstairs. The gauge is arranged to transmit its pressure readings, so that they can be received by the computer, either directly or through a control board 84 that exchanges data and/or instructions with the computer 82 and an actuator 86. The actuator 86 will thus be able to be controlled to open and close for a predetermined time period for releasing an approximately fixed or known volume of water, and the pressure gauge 72 will be able to feed readings to the computer 82 for processing.

As shown, the gauge 72 is connected via a secondary T joint 88, and a beaker 90 collects dispensed water. The beaker 90 might instead be a sink or drain. Other connection arrangements are possible for the gauge 72, and the other elements of this set-up 80.

Figure 11:
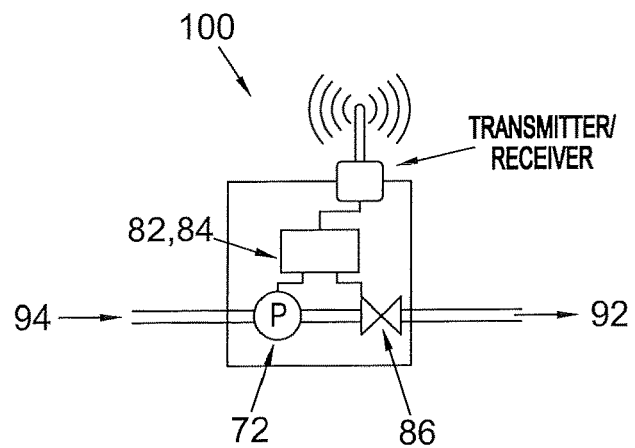
FIG. 11 shows a more integrated version of the automated arrangement, with a transmitter for communicating with a communications device, or a second pressure sensor, or both.

In a preferred arrangement, the set-up is packaged into a single, low cost integrated unit which can send and receive pressures internally, and likewise control the water flow through its own integrated pipework and actuator. It can also or alternatively transmit and/or receive instructions or readings to or from other devices, such as a second pressure sensor and/or a pump, as per the third aspect of the invention. It can even be arranged to communicate with an external device, e.g. wirelessly, such as a smartphone or computer used by a plumber, for more remote applications, or applications where access with a computer is more restricted. Having an ability to use wireless technologies (or intranet technologies) can also facilitate transmission of data to or from a remote pressure sensor and pump, as per the third aspect of the present invention, to control and receive data from them through a building's Wi-Fi (or intranet). FIG. 11 shows a possible integrated unit 100 for locating at a lower end of a water system 10, 50, or a part thereof. It still has the pressure sensor 72, actuator 86 and a computer/processor/control board 82, 84. It also has a venting pipe 92 and an input pipe 94 for connecting wherever suitable (e.g. the aforementioned washing machine attachment point 70). It also has a transmitter to allow control or interrogation by a smartphone or separate computer, or for receiving data from the second pressure sensor or commands from the smartphone or separate computer (where provided).

The above processes and equipment can thus all be combined into a single method of detecting and locating leaks as follows:
1. Checking the pressurised section of the water system using the process of the first aspect of the present invention—the pressure sensor and timer, or the device of the third, fourth or fifth aspect.
2. Where necessary, checking the vented side (the header side) for leaks using the process described in the second aspect of the present invention.
3. While these processes are running visually inspecting the house for obvious sources of leaks. (dripping taps, running toilets, water marks on walls/ceilings etc.)
4. EITHER—Step 1 (or 2 if needed) returns no leaks, in which case the house is free of leaks,
    OR—Step 1 (or 2 if needed) signals there is a leak, but the visual inspection of Step 3 located it, in which an attempt to repair the leak can be made before re-running step 1 (or 2 if needed).
    OR—Step 1 (or 2 if needed) indicates there is a leak but the inspection failed to find it. In this case the method of the third aspect needs to be run (or the $4^{th}$ or the $5^{th}$ with two sensors and the pump) to carry out its leak location indicating process.

The process outlined in the third and fourth aspects of the invention could be almost fully automated when used in conjunction with the device described in respect of FIG. 10 or 11 of the fifth aspect of the invention.

Figure 12:
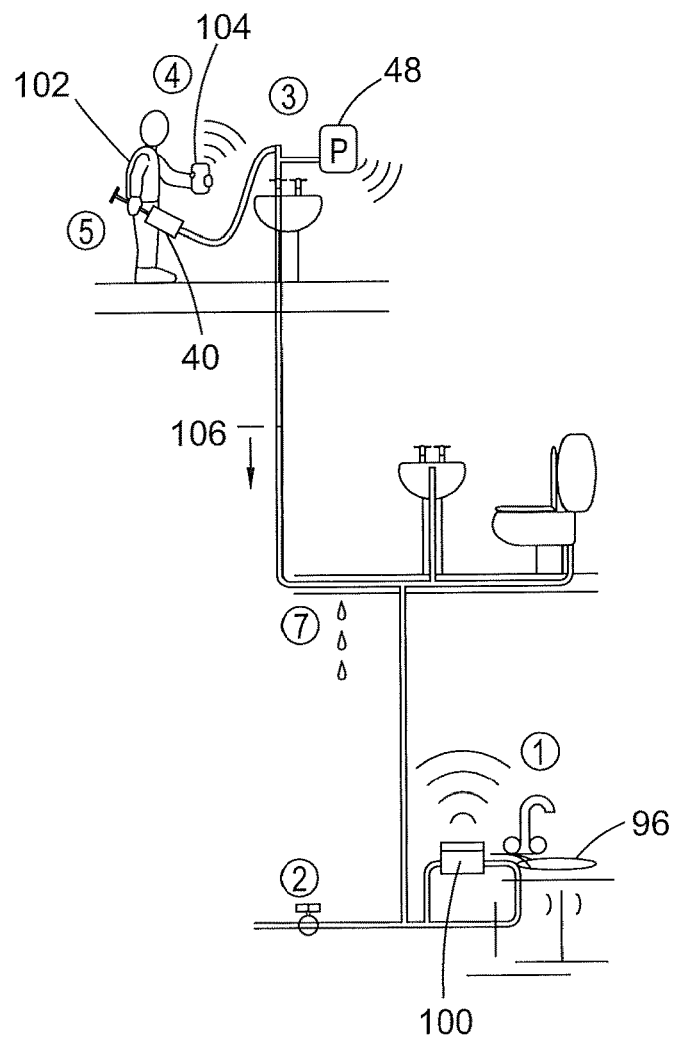
FIG. 12 shows the system of FIG. 11, with a second sensor and pump in accordance with FIG. 6 in a three story water system.
Figure 13:
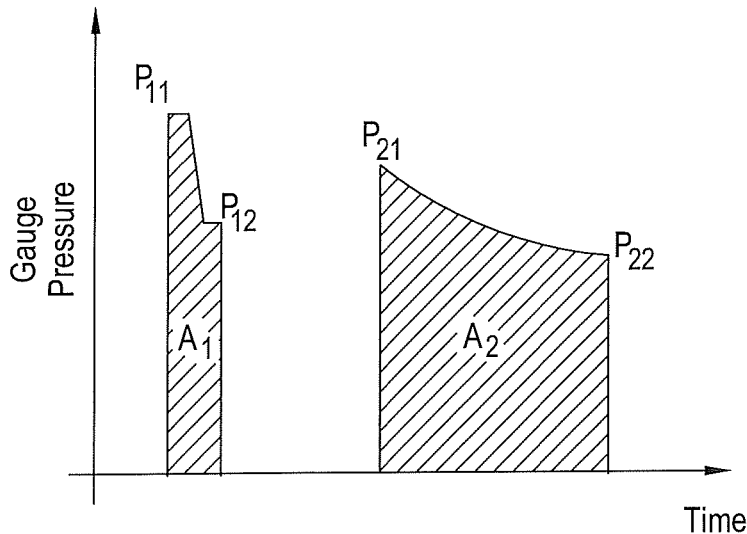
FIG. 13 illustrates areas below the pressure time plots that can be used in calculations as described above.
Figure 14:
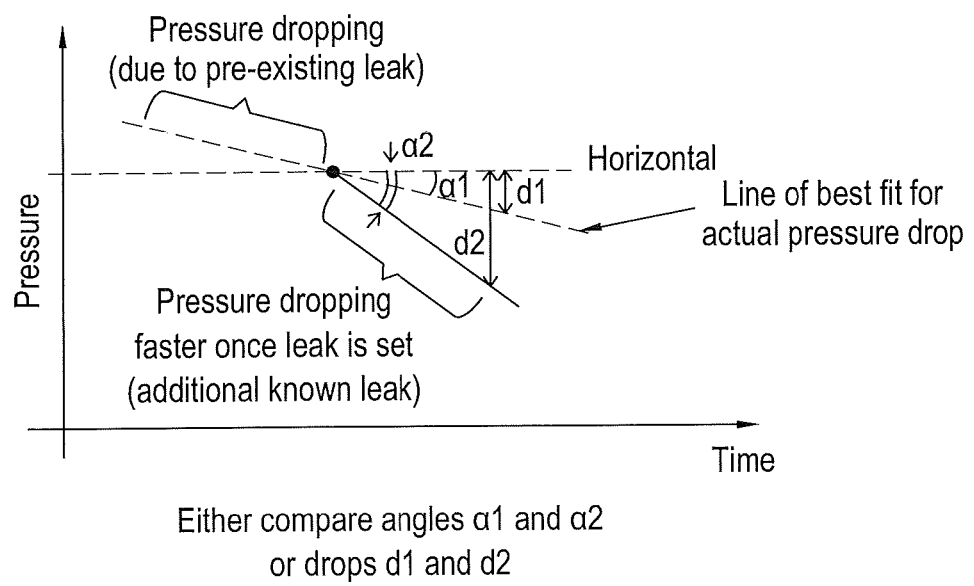
FIG. 14 illustrates line angles or line drops that can alternatively be used in calculations as described above.

A control program, either run directly on the actuator 86 (the water release device), or run on a second device such as a mobile phone, tablet or computer that is in contact with the actuator, e.g. via the control board 84 or processor 82, 84 would release a pre-set volume of water, run through the process of the third aspect of the present invention to look for a leak, and then either update the operator of results or progress to releasing the next volume of water. The system could thus inform the operator when a leak has been found, or instruct the operator, or an automated pump 40, to pump up the system, or to let air out as needed. An example of such an arrangement is shown schematically in FIG. 12.

With this system, the operator 102 acts as follows:
1. Set up the actuator/water release device 100 downstairs for leak testing in accordance with the first aspect of the present invention—connecting to, for example, a washing machine attachment point 70 and arranged, for example, for releasing water into a sink 96. In this embodiment the actuator/water release device 100 is adapted similar to the device shown in FIG. 11 and is arranged to communicate with an app on a phone 104—here the one held by the operator 102.

2. Once connected, the operator (usually a plumber) turns off stopcock (or turns it on to re-pressurise, and then turns it off).
3. The method of the first aspect of the present invention is then carried out. If a leak is detected by that method, but cannot be found by a visual inspection, the operator 102 connects a pump 40 and pressure sensor 48—or a combined/integrated unit combining the two, to a point on the water system as high in the house as possible— here a top floor basin. In this embodiment the upper pressure sensor is in wireless communication with the water release mechanism, or optionally with a smartphone, tablet or computer, or other such controlling device 104 if the controlling device provides instructions based thereon to the actuator/water release device 100.
4. The operator can then trigger the leak location program of the third aspect of the present invention, or the fourth, or the fifth, on the water release device 100, for example using the controlling device 104. The program thus starts running and the two pressure sensors 48, 72 and the water release device 100 carry out the method of the third, fourth or fifth aspects of the present invention, preferably updating the plumber on progress, and preferably mapping the system as it goes.
5. If the program senses that the pressure is too low, the program can ask the plumber to pump more air in the system, or can command an automated pump to do so.
6. The water level 106 will continue to drop as the mechanism periodically releases volumes of water during the process, potentially in set volumes.
7. Finally, when the leak is found (either due to a sudden drop in pressure or because head is no longer falling) the sensor will alert the operator and tell them at what height the leak is located, and whether it is on a vertical or horizontal run of pipework.
8. The operator can then focus his inspections on appropriate locations, find and fix the leak and re-run the method of the first aspect of the present invention to check the system is now sound.

The present invention therefore provides useful leak detection methods, leak location methods that provide information about the location of the leak, such as height and pipe attitude (vertical or horizontal) and also leak flow rates. The present invention also provides integrated units or kits of parts for achieving these methods, and the system that operates in including manual or automated versions, and versions that can communicate with computers, smartphones or other mobile communicating devices, whether wired, wireless, local to the building or remote from the building.

Further Statements of Invention

1. A method for estimating a position or height of a leak within at least a part of a water system, the method comprising the use of two pressure sensors and a pump, wherein one of the two pressure sensors is located towards a top of the part of the water system being tested and the other pressure sensor is located towards a bottom of the part of the water system being tested, the pump being for enabling maintenance of a volume of air above the water level within the water system at a pressure greater than atmospheric to make the water in the water system pressurised, the method comprising:
closing all known water usage taps within the part of the water system to be tested;
isolating the part of the water system (50) from its replacement water source;
checking the pressures on the sensors and elevating the pressure of the volume of air if needed to pressurise the water system; and
determining the difference between the pressures sensed by two pressure sensors to determine a head of the water within the system, the head representing the height of the water above the lower of the two sensors;
intermittently venting water out of the water system and measuring the pressures sensed by the two pressure sensors once the vents are closed to allow a subsequent head to be calculated; and
re-ascertaining the differences between the pressures to calculate the new head;
wherein if the detected pressures start to drop faster than normal whilst the system is isolated after one such intermittent venting of water, the location of a leak has been identified as at, or just above, the top of the water level, the height thereof being represented by the head just calculated.

2. The method of clause 1, further comprising a balloon, connected to the volume of air.

3. The method of clause 1 or clause 2, wherein the water system is a non-pressurised water system fed by a header tank.

4. The method of any one of clauses 1 to 3, wherein the calculated values of the head are monitored or recorded.

5. The method of clause 4, wherein if the head remains constant for a sequence of water releases, the method will establish that the water system at that head comprises horizontal pipework.

6. The method of clause 4 or clause 5, wherein if the head drops during a sequence of water releases, then the method establishes that through that range of heads the water system comprises vertical pipework.

7. The method of clauses 5 and 6, wherein the method is used to schematically map a building's plumbing system.

8. The method of any one of clauses 1 to 7, wherein the vented water is vented as units of water, the units being approximately fixed volumes of water determined by timed duration of release.

9. The method of clause 8, wherein the timed duration of release remains constant for each intermittent release of water, whereby approximated water volumes for each release are known for a given pressure and vent size.

10. The method of any one of clauses 1 to 7, wherein the vented water is either vented in fixed volumes, or the volumes vented are measured, for each vented volume.

11. The method of any one of clauses 8 to 10, wherein with the information regarding the volume of water vented, the method then also approximates the cross sectional area of any detected vertical pipework at a given head by dividing the approximated or measured volume of water vented in a particular sequence by the change of head height measured.

12. The method of any one of clauses 8 to 11, wherein with the information regarding the volume of water vented, the method then also approximates the length of horizontal pipes located in any detected horizontal stretch by dividing the approximated or measured volume of water vented by a standardised cross-sectional area for the type of pipes being tested.

13. The method of any one of clauses 1 to 12, wherein the method monitors the head for a period of time between each venting of water, in particular when detecting a drop in head after a period of static head, and if after the initial drop in head, the head is still slowly dropping during that period of time, then the method determines that the water level is above the leak, so the testing can continue to a next release of water, whereas if the head instead stops falling, the leak can be concluded to be in the horizontal section identified by the static head.

14. The method of any one of clauses 1 to 13, wherein if the measured pressure at the top drops below a set minimum, the pump is used to pump more air in at the top as the pressure in the section being tested needs to exceed the static head pressure.

15. The method of any one of clause 1 to 14, wherein if the measured pressure at the bottom rises above a set maximum, the pump or a pressure release valve is opened to allow air out of the water system.

16. An automated method for mapping at least a part of a water system, the method comprising the use of two pressure sensors and a pump, wherein an upper of the two pressure sensors is located towards a top of the part of the water system being tested and the a lower of the two pressure sensors is located towards a bottom of the part of the water system being tested, the pump being for enabling maintenance of a volume of air above the water level within the water system at a pressure greater than atmospheric to make the water in the water system pressurised, the method comprising:

closing all known water usage taps within the part of the water system to be tested;

isolating the part of the water system (50) from its replacement water source;

checking the pressures on the sensors and elevating the pressure of the volume of air if needed to pressurise the water system; and determining the difference between the pressures sensed by two pressure sensors to determine a head of the water within the system, the head representing the height of the water above the lower sensor;

intermittently venting water out of the water system and measuring the pressures sensed by the two pressure sensors once the vents are closed to allow a subsequent head to be calculated; and re-ascertaining the differences between the pressures to calculate the new head;

wherein if the head remains constant for a sequence of water releases, the method will establish that the water system at that head comprises horizontal pipework, and if the head drops during a sequence of water releases, then the method establishes that through that range of heads the water system comprises vertical pipework.

17. The method of clause 16, wherein the vented water is vented as units of water, wherein the units are fixed or measured volumes of water.

18. The method of clause 16, wherein the vented water is vented as units of water, wherein the unit is an approximated volume, determined by a timed duration of release.

19. The method of clause 17 or clause 18, wherein with the information regarding the volume of water—approximated or measured, the method then also approximates the cross sectional area of any detected vertical pipework at a given head by dividing the approximated or measured volume of water vented in that particular sequence by the change of head height measured.

20. The method of clause 17, clause 18 or clause 19, wherein with the information regarding the volume of water—approximated or measured, the method then approximates the length of any detected horizontal pipes located in a horizontal stretch by dividing the approximated or measured volume of water vented in that particular sequence by the expected cross-sectional area of the pipework based upon standardised cross sectional area values for the pipes being tested.

21. The method of any one of clauses 16 to 20, wherein if the measured pressure at the top drops below a set minimum, the pump is used to pump more air in at the top as the pressure in the section being tested needs to exceed the static head pressure.

22. The method of any one of clauses 16 to 21, wherein, if the measured pressure at the bottom rises above a set maximum, the pump or a pressure release valve is opened to allow air out of the water system.

23. A system for carrying out any one or more of the methods set out in any one or more of clauses 1 to 22.

24. A pressure sensor module comprising a pressure sensor and a venting tap, the module further comprising a threaded cap, and tubing to connect the pressure sensor and venting tap with a water system of a building through the cap.

25. The pressure sensor module of clause 24, wherein the threaded cap is sized to fit a washing machine attachment point of the water system of the building.

26. The pressure sensor module of clause 24, further comprising a transmitter to transmit pressure readings taken by the sensor, and/or water volume indicators.

27. The pressure sensor module of any one of clauses 45 to 47, wherein the transmissions are wireless transmissions.

28. The pressure sensor module of any one of clauses 24 to 27, wherein the venting tap is adapted to be controlled by an actuator that is driven by a processor or computer.

29. The pressure sensor module of clause 28, wherein the actuator and a processor therefor are mounted on the module.

30. The pressure sensor module of any one of clauses 24 to 29, further comprising a receiver for receiving externally transmitted pressure sensor readings.

31. A water system testing system comprising the pressure sensor module of clause 30 and a separate pressure sensor for transmitting the externally transmitted pressure sensor readings.

32. A pressure sensor module comprising a transmitter and receiver, a threaded cap, a venting tap, an actuator for the venting tap and a control board therefor, a pressure sensor, tubing or flow channels for connecting the pressure sensor and the venting tap to the threaded cap, all assembled into an integrated assembly.

33. A kit comprising the pressure sensor module of clause 32 and a sensor and pump assembly.

34. The kit of clause 33, wherein the sensor and pump assembly is an integrated unit, with a receiver and transmitter, and with a control board for the pump.

35. The kit of clause 34, further comprising an app or program for a computer, tablet or smartphone such that the kit can be used to operate one or more of the methods of clauses 1 to 22.

These and other features of the present invention have been described above purely by way of example. Modifications in detail may be made to the invention within the scope of the claims appended hereto. In particular, features from one method, device, apparatus, claim (dependent or independent) or clause or aspect may beneficially be used with any other method, device, apparatus, claim (dependent or independent), or clause or aspect—particularly the non-essential or preferred features of each method, device or aspect, or the features within the dependent claims or clauses.

The invention claimed is:

1. A method for testing for a possible water leak in a water system, comprising:
   closing all known water usage taps within a part of the water system to be tested;
   closing at least one stop cock or valve of the water system to isolate the part of the water system to be tested from its replacement water source, and any external replacement pressure source; and then
   a) detecting a first pressure $P_0$ within the isolated part of the water system at a sensor connected to the isolated part of the water system, waiting a period of time t and then detecting a second pressure $P_1$ within the isolated part of the water system at that sensor; and
   b) releasing and measuring a volume of water $V_R$ from the water system out of the isolated part of the water system via a vent in the isolated part of the water system, before then closing the vent, step b) further comprising detecting a pressure of either side of that release at that sensor;
   the method further comprising recording a) a pressure loss in the isolated part of the water system over a period of time t caused by an unknown leak volume of water $V_L$ escaping the isolated part of the water system and b) a pressure loss in the isolated part of the water system caused by the released and measured volume of water $V_R$;
   the method further comprising using the pressure drop caused by the released and measured volume of water $V_R$ to estimate a relationship between change in pressure in the isolated part of the water system and the released and measured volume $V_R$, and based on the estimated relationship between the change in pressure and the released and measured volume of water $V_R$, calculating an estimate of the actual volume of the unknown leak volume of water $V_L$ based upon the recorded pressure loss in the system in the period of time t;
   wherein no pressure reset is provided between sets of recordings.

2. The method of claim 1, wherein step a) is carried out before step b).

3. The method of claim 1, wherein one of the two detected pressures of step a) is one of the two detected pressures of step b).

4. A method for testing for a possible water leak in a water system, comprising:
   closing all known water usage taps within a part of the water system to be tested;
   closing at least one stop cock or valve of the water system to isolate the part of the water system to be tested from its replacement water source or sources, and any external replacement pressure sources; and then
   a) detecting or determining a first pressure $P_0$ within the isolated part of the water system at a sensor connected to the isolated part of the water system;
   detecting or determining a second pressure $P_1$ within the isolated part of the water system at that sensor after a period of time t, and;
   b) releasing and measuring a volume of water $V_R$ from the water system out of the isolated part of the water system via a vent connected to the isolated part of the water system, before then closing the vent and detecting or determining a third pressure $P_2$ within the re-isolated part of the water system at that sensor;
   the method further comprising:
   calculating an approximate leaked water loss $V_L$ by using the following equation:

$$V_L = V_R * P_2 (P_0 - P_1) / (P_0 (P_1 - P_2))$$

when using absolute pressures or $$V_L = V_R * (P_2 + P_{Atm}) * (P_0 - P_1) / ((P_0 + P_{Atm}) * (P_1 - P_2))$$

if instead using gauge pressures, $P_{atm}$, being the atmospheric pressure where the sensor is located.

5. The method of claim 4, wherein the time between taking the second and third pressures $P_1$ and $P_2$ is less than 20 seconds.

6. The method of claim 4, wherein the time between taking the second and third pressures $P_1$ and $P_2$ is between 1 and 12 seconds.

7. The method of claim 4, wherein the vent for releasing the volume of water $V_R$ is a part of a test assembly that includes the sensor.

8. The method of claim 4, further comprising:
   taking multiple pressure readings before and after the release of the volume of water, and then, extrapolating at least one line or curve fitted to the pressure values forwards or backwards such that second and third pressure values can be derived from the extrapolation that represents an instantaneous pressure change resulting from the release of the volume of water $V_R$, the extrapolated values being used in any calculations in place of respective measured values thereof.

9. A method for testing for leaks in at least a part of a water system with a water leak, comprising:
   closing all known water usage taps within a part of the water system to be tested;
   closing at least one stop cock or valve of the water system to isolate the part of the water system to be tested from its replacement water source, and any external replacement pressure sources; and then:
   a) detecting pressures within the isolated part of the water system at a sensor connected to the isolated part of the water system at various intervals for a period of time t long enough to obtain a sequence of pressure readings; and
   b) releasing and measuring a volume of water $V_R$ from the water system out of the isolated part of the water system via a vent connected to the isolated part of the water system, before then closing the vent, step b) further comprising detecting pressures of either side of that release at that sensor;
   wherein the pressures of either or both of steps a) and b) are extrapolated to approximate two pressures, at a single time-point, the pressures being a pre-water-release pressure P1 and a post-water-release pressure P2, and
   wherein no pressure reset is provided between sets of recordings.

10. The method of claim 9, wherein step a) occurs before step b).

11. The method of claim 9, wherein one of the detected pressures of step b) is one of the detected pressures of step a).

12. The method of claim 9, wherein a gradient or decay rate of the pressure during the sequence of pressure readings is determined, and the method then further comprises using that decay rate, and the pressure drop caused by the release of the approximately known volume of water $V_R$ to enable an estimate of a water loss from the water leak to be determined.

13. The method of claim 9, wherein the various intervals are fixed and known intervals.

14. The method of claim 9, wherein the various intervals are recorded and the pressures detected are recorded against the time when they were taken.

15. The method of claim 9, further comprising:
calculating an approximate leaked water loss $V_L$ by using the following equation:

$$V_L = V_R * P_2 (P_0 - P_1) / (P_0 (P_1 - P_2))$$

when using absolute pressures or $$V_L = V_R * (P_2 + P_{Atm}) * (P_0 - P_1) / ((P_0 + P_{Atm}) * (P_1 - P_2))$$

if instead using gauge pressures, $P_{atm}$ being the atmospheric pressure where the sensor is located, $P_0$ being a pressure at a time prior to $P_1$ and $P_2$,
where if $V_L > 0$, it is determined that there is a possible water leak.

16. The method of claim 15, wherein the pressure $P_0$ is also extrapolated from the first sequence of pressure readings.

17. The method of claim 9, wherein each sequence of pressure readings comprises at least 4 pressure readings.

18. The method of claim 9, further comprising:
extrapolating forward a gradient or fitted curve of a pressure profile recorded against time from the sequence of pressure readings before water is released to determine an estimated pre-release pressure at a time when a post-release pressure was recorded, and thus an instantaneous pressure difference at that time.

19. The method of claim 9, wherein each sequence of pressure readings comprises at least 10 pressure readings.

\* \* \* \* \*